(12) United States Patent
Shastri et al.

(10) Patent No.: US 9,134,498 B2
(45) Date of Patent: Sep. 15, 2015

(54) COUPLING SYSTEM FOR OPTICAL FIBERS AND OPTICAL WAVEGUIDES

(71) Applicant: Cisco Technology, Inc., San Jose, CA (US)

(72) Inventors: Kalpendu Shastri, Orefield, PA (US); Ravi Sekhar Tummidi, Breinigsville, PA (US); Vipulkumar Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 13/945,702

(22) Filed: Jul. 18, 2013

(65) Prior Publication Data
US 2015/0021291 A1    Jan. 22, 2015

Related U.S. Application Data

(63) Continuation of application No. 13/945,134, filed on Jul. 18, 2013.

(51) Int. Cl.
| | |
|---|---|
| *G02B 6/12* | (2006.01) |
| *G02B 6/46* | (2006.01) |
| *B32B 37/16* | (2006.01) |
| *B32B 38/00* | (2006.01) |
| *B32B 38/10* | (2006.01) |
| *G02B 6/30* | (2006.01) |
| *G02B 6/28* | (2006.01) |

(52) U.S. Cl.
CPC . *G02B 6/46* (2013.01); *B32B 37/16* (2013.01); *B32B 38/0004* (2013.01); *B32B 38/0012* (2013.01); *B32B 38/10* (2013.01); *G02B 6/12* (2013.01); *G02B 6/2826* (2013.01); *G02B 6/30* (2013.01); *B32B 2038/0016* (2013.01); *B32B 2307/202* (2013.01); *B32B 2307/40* (2013.01)

(58) Field of Classification Search
CPC .... G02B 6/4291; G02B 6/4216; G02B 6/421; G02B 6/429; G02B 6/305; G02B 6/30; G02B 6/12; G02B 6/46; G02B 6/2826
USPC ...................................... 385/30, 43
See application file for complete search history.

(56) References Cited

U.S. PATENT DOCUMENTS

| | | | |
|---|---|---|---|
| 3,912,363 A | 10/1975 | Hammer | |
| 4,738,511 A * | 4/1988 | Fling | 385/30 |

(Continued)

FOREIGN PATENT DOCUMENTS

| | | |
|---|---|---|
| EP | 0 147 168 A2 | 7/1985 |
| JP | 09159865 A | 6/1997 |

OTHER PUBLICATIONS

T. Alder et al., "High-Efficiency Fiber-to-Chip Coupling Using Low-Loss Tapered Single-Mode Fiber", IEEE Photonics Technology Letters, vol. 12, No. 8, Aug. 2000, pp. 1016-1018.

(Continued)

*Primary Examiner* — Rhonda Peace

(57) ABSTRACT

An optical coupler may include a fiber optic structure that has a portion of an outer surface that is beveled at a predetermined angle relative to a longitudinal axis of the fiber optic structure. The beveled outer surface portion may be optically coupled with a waveguide core of an optical integrated circuit. The fiber optic structure may also include a second outer surface portion that is butt coupled to an end of an optical fiber to optically couple the second outer surface portion with the optical fiber.

20 Claims, 18 Drawing Sheets

(56) References Cited

U.S. PATENT DOCUMENTS

| | | | |
|---|---|---|---|
| 4,779,945 A | | 10/1988 | Hill et al. |
| 5,018,817 A | * | 5/1991 | Suzuki et al. ............... 385/49 |
| 5,781,675 A | | 7/1998 | Tseng et al. |
| 6,445,854 B1 | * | 9/2002 | Miller ........................ 385/38 |
| 6,535,685 B1 | * | 3/2003 | Tullis ........................ 385/137 |
| 6,912,345 B2 | * | 6/2005 | Dautartas et al. ............ 385/43 |
| 7,162,124 B1 | * | 1/2007 | Gunn et al. .................. 385/37 |
| 7,366,380 B1 | * | 4/2008 | Peterson et al. ............. 385/47 |
| 7,373,052 B2 | * | 5/2008 | Nadeau et al. .............. 385/50 |
| 8,639,073 B2 | * | 1/2014 | Pelletier et al. .............. 385/37 |
| 2003/0081902 A1 | | 5/2003 | Blauvelt et al. |
| 2007/0258680 A1 | * | 11/2007 | Nadeau et al. ............... 385/30 |
| 2013/0022316 A1 | * | 1/2013 | Pelletier et al. .............. 385/37 |

OTHER PUBLICATIONS

J.K. Doylend et al., "Design and Simulation of an Integrated Fiber-to-Chip Coupler for Silicon-on-Insulator Waveguides", IEEE Journal of Selected Topics in Quantum Electronics, vol. 12, No. 6, Nov./Dec. 2006, pp. 1363-1370.

R. Halir et al., "Continuously apodized fiber-to-chip surface grating coupler with refractive index engineered subwavelength structure", Oct. 1, 2010, vol. 35, No. 19, Optics Letters, pp. 3243-3245.

R. Hauffe et al., "Methods for Passive Fiber Chip Coupling of Integrated Optical Devices", 2000 Electronic Components and Technology Center, pp. 238-243.

Anatol Khilo et al., "Efficient planar fiber-to-chip coupler based on two-stage adiabatic evolution", Jul. 19, 2010, vol. 18, No. 15, Optics Express, pp. 15790-15806.

Rong Sun et al., "High performance asymmetric graded index coupler with integrated lens for high index waveguides", Applied Physics Letters 90, 2007, 201116-101116-3.

D. Vermeulen et al., "High-Efficiency Fiber-to-Chip Grating Couplers realized using an Advanced CMOS-Compatible Silicon-on-Insulator Platform", 2010 Optical Society of America, 6 pages.

International Search Report and Written Opinion for corresponding application No. PCT/US2014/045959 mailed Oct. 23, 2014.

* cited by examiner

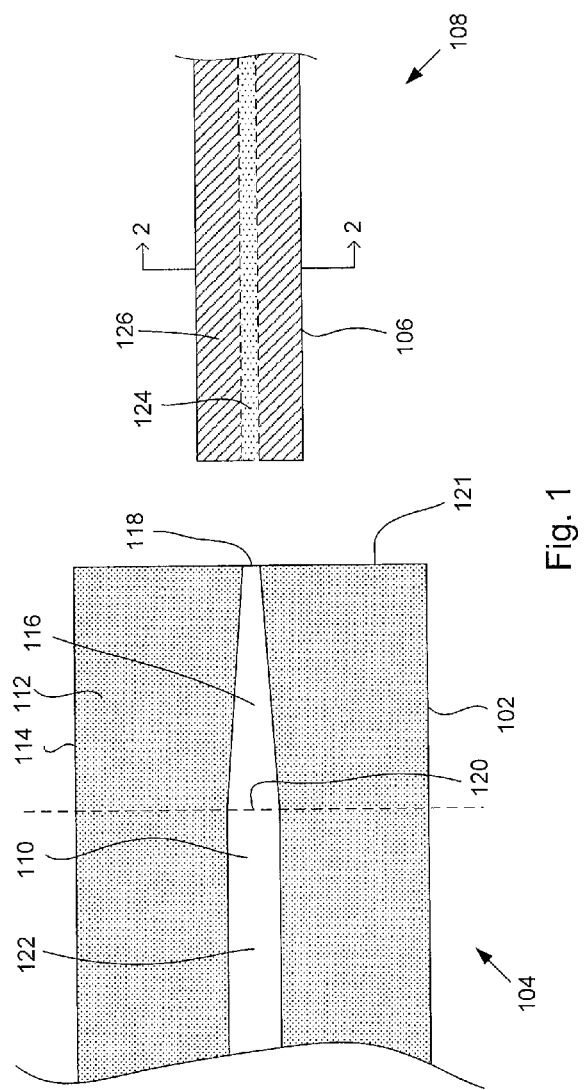
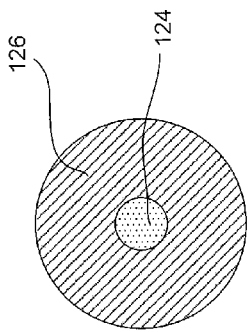

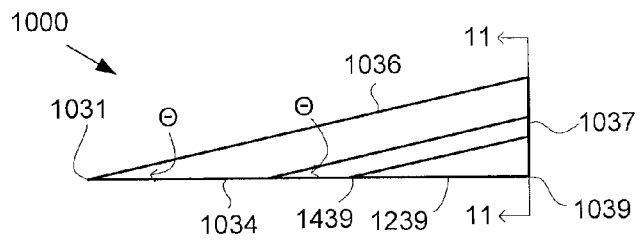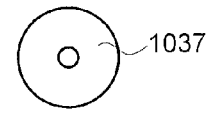
Fig. 10
Fig. 11
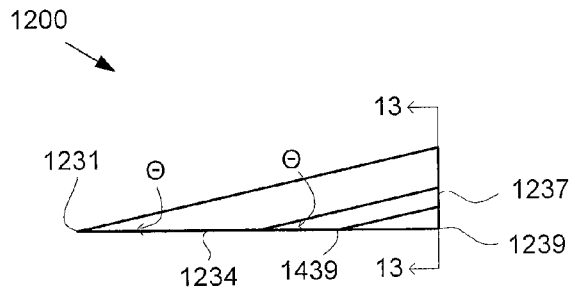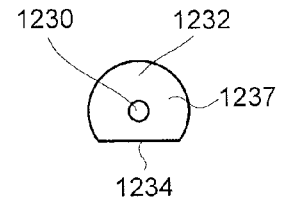
Fig. 12
Fig. 13
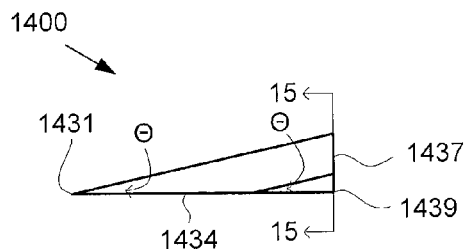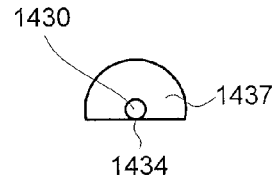
Fig. 14
Fig. 15

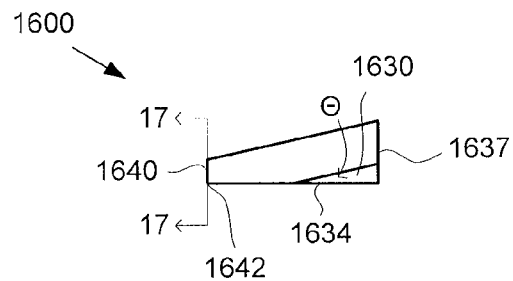
Fig. 16                    Fig. 17
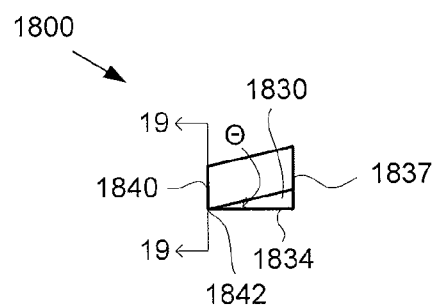
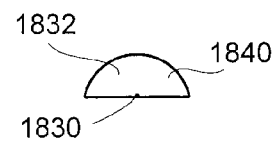
Fig. 18                    Fig. 19
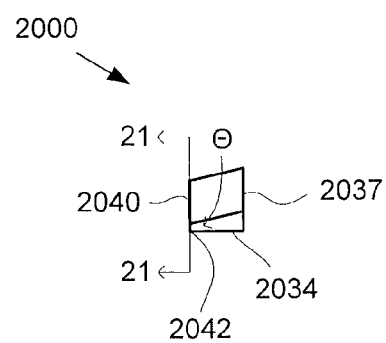
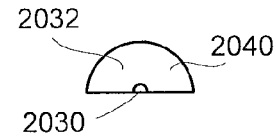
Fig. 20                    Fig. 21

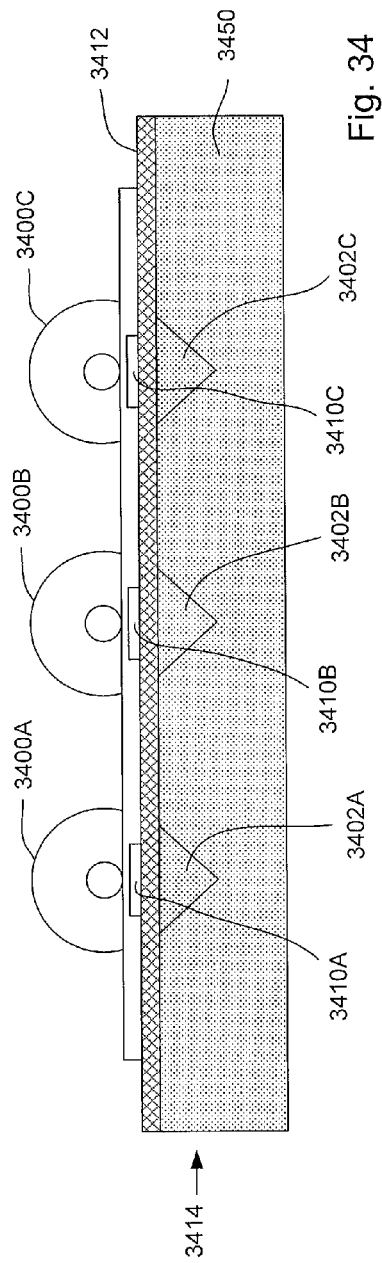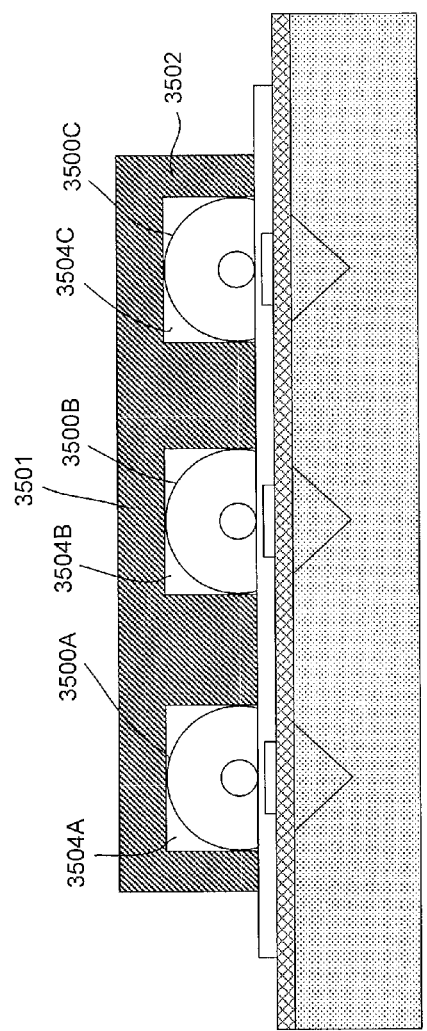

COUPLING SYSTEM FOR OPTICAL FIBERS AND OPTICAL WAVEGUIDES

CROSS-REFERENCE TO RELATED APPLICATION

This application is a continuation of U.S. Non-Provisional application Ser. No. 13/945,134, filed Jul. 18, 2013. The contents of U.S. Non-Provisional application Ser. No. 13/945,134 are hereby incorporated by reference in their entirety.

TECHNICAL FIELD

The present disclosure relates generally to optical couplers, and more particularly to an angled fiber optic structure configured to optically couple an optical waveguide with an optical fiber.

BACKGROUND

Optical or light signals carrying information may be transmitted over optical communication links, such as optical fibers or fiber optic cables. Optical integrated circuits may receive the optical signals and perform functions on the optical signals. Communicating the optical signals between the optical fibers and the optical integrated circuits with a maximum amount of coupling efficiency is desirable. Alignment techniques, including active and passive alignment techniques, may be used to achieve maximum coupling efficiency. Active alignment may be costly because it involves active electronics and feedback loops.

BRIEF DESCRIPTION OF THE DRAWINGS

FIG. 1 illustrates a top view of a front end of an optical integrated circuit and an end of an optical fiber.

FIG. 2 illustrates an axial cross-sectional view of an optical fiber.

FIG. 10 illustrates a cross-sectional side view of an alternative example optical coupler.

FIG. 11 illustrates a cross-sectional axial view of the optical coupler in FIG. 10.

FIG. 12 illustrates a cross-sectional side view of a second alternative example optical coupler.

FIG. 13 illustrates a cross-sectional axial view of the optical coupler in FIG. 12.

FIG. 14 illustrates a cross-sectional side view of a third alternative example optical coupler.

FIG. 15 illustrates a cross-sectional axial view of the optical coupler in FIG. 14.

FIG. 16 illustrates a cross-sectional side view of a fourth alternative example optical coupler.

FIG. 17 illustrates a cross-sectional axial view of the optical coupler in FIG. 16.

FIG. 18 illustrates a cross-sectional side view of a fifth alternative example optical coupler.

FIG. 19 illustrates a cross-sectional axial view of the optical coupler in FIG. 18.

FIG. 20 illustrates a cross-sectional side view of a sixth alternative example optical coupler.

FIG. 21 illustrates a cross-sectional axial view of the optical coupler in FIG. 20.

FIG. 34 illustrates an axial view of an alternative optical system that includes a plurality of optical couplers.

FIG. 35 illustrates an axial view of another alternative optical system that includes a plurality of optical couplers disposed in a housing.

DETAILED DESCRIPTION

Overview

Figure 3:
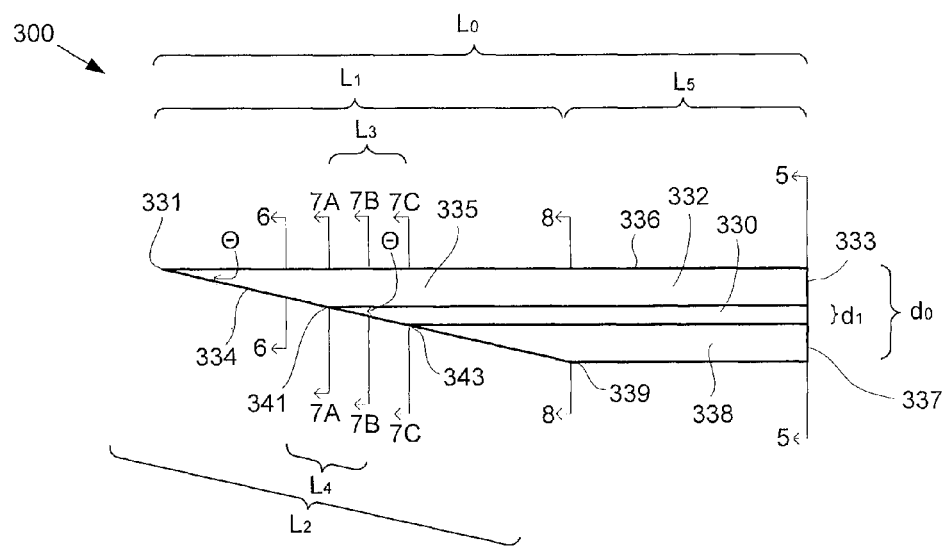
FIG. 3 illustrates a cross-sectional side view of an example optical coupler.

An apparatus includes an optical coupler that has a fiber optic structure that comprises a core portion and a cladding portion. The fiber optic structure also has an outer surface that includes a first outer surface portion configured to optically couple the optical coupler with an optical waveguide. The first outer surface portion is beveled at a predetermined angle relative to a longitudinal axis of the fiber optic structure. The outer surface also includes a second outer surface portion configured to optically couple the optical coupler with an optical fiber.

Another apparatus includes an optical coupler configured to optically couple a waveguide core of an optical integrated circuit with an optical fiber. The optical coupler includes a fiber optic structure that comprises a core portion and a cladding portion. The core portion includes a first end and a second end, where the core portion has a height that increases from the first end to the second end according to a predetermined angle determined relative to a longitudinal axis of the fiber optic structure. In addition, the fiber optic structure has a flat outer surface portion that is beveled according to the predetermined angle, where the beveled flat outer surface portion comprises both the core portion and the cladding portion.

A system includes an optical waveguide structure of an optical integrated circuit. The optical waveguide structure includes a substrate and a waveguide core forming an optical waveguide path disposed on the substrate. The system also includes an optical coupler disposed over the waveguide core. The optical coupler includes a fiber optic structure that comprises a core portion and a cladding portion. An outer surface of the fiber optic structure includes a first outer surface portion beveled at a predetermined angle relative to a longitudinal axis of the fiber optic structure, where the beveled first outer surface portion is a substantially flat surface that includes the core portion and the cladding portion. Also, the substantially flat beveled first surface portion faces the waveguide core to optically couple the optical coupler with the waveguide core. The outer surface also includes a second outer surface portion that includes the core portion and the cladding portion.

A method includes affixing an optical fiber in a channel formed in a slab to form an integrated structure, where the optical fiber has a core portion and a cladding portion. The method also includes removing a first portion of the integrated structure from a second portion of the integrated structure at a predetermined angle defined relative to a longitudinal axis of the fiber optic structure. The second portion has an outer surface portion that is beveled at the predetermined angle after removing the first portion from the second portion. In addition, the beveled outer surface portion includes both the core portion and the cladding portion.

Another method includes forming a channel in a slab, where the channel has a depth that increases according to a predetermined angle from a first end to a second end of the slab. The method also includes affixing a rounded outer surface of an optical fiber to inner walls of the slab, where the inner walls define the channel, and where a first portion of the optical fiber is disposed in the channel and a second portion of the optical fiber is outside of the channel. Further, the method includes removing at least some of the second portion of the optical fiber that is outside of the channel to form a flat outer surface of the optical fiber that is beveled at the predetermined angle, wherein the flat outer surface comprises a core and a cladding of the optical fiber.

Another method includes applying an adhesive material to a top layer of an optical waveguide structure of an optical integrated circuit. The method also includes aligning a beveled outer surface portion of a fiber optic structure with a nanotaper portion of the optical waveguide structure, where the beveled outer surface is beveled at a predetermined angle relative to a longitudinal axis of the fiber optic structure. The method also includes contacting the beveled outer surface of fiber optic structure to the adhesive material to affix and optically couple the fiber optic structure to the optical waveguide structure.

Description of Example Embodiments

The present disclosure describes an optical coupler or coupling mechanism that is configured to optically couple one or more optical waveguides or waveguide paths with one or more optical fibers. The optical waveguides may be included with or as part of an optical waveguide structure, which may be located "on chip" or included as part of an optical integrated circuit (IC). The optical IC may be configured to process or perform functions on optical signals, such as modulation, bending light, coupling, and/or switching, as examples. The optical fibers may be optical components that are external to the optical IC. The optical fibers may be configured to communicate or carry the optical signals to and/or away from the optical IC. The optical coupler may be configured to optically couple the optical waveguide paths with the optical fibers so that the optical signals may be communicated between the optical IC and the optical fibers with optimum coupling efficiency (or minimum coupling loss).

FIG. 1 shows a top view of an example IC front end 102 of an optical IC 104 and an example fiber end 106 of an optical fiber 108. The optical IC 104 and the optical fiber 108 may be configured to communicate optical signals between each other through the IC front end 102 and the fiber end 106. The IC front end 102 may include an optical waveguide or waveguide structure that may include an optical waveguide core 110 disposed on a top planar surface 112 of a substrate 114. The waveguide structure may also include an optical waveguide cladding (not shown in FIG. 1) that encases or surrounds the optical waveguide core 110. The optical waveguide core 110 may make up or form an optical waveguide path through which optical signals may propagate. FIG. 1 shows an example configuration of the IC front end 102 that includes a single waveguide core 110 making up a single optical waveguide path. In alternative example configurations, multiple optical waveguide cores making up multiple optical waveguide paths may be included in the IC front end 102. The optical waveguide path may communicate optical signals to and from processing circuitry (not shown) of the optical IC that performs the functions on the optical signals.

The optical waveguide core 110 may include a nanotaper 116 (also referred to as taper or an inverse taper) to couple optical signals received from the optical fiber 108 to the IC front end 102 and/or to couple optical signals to be transmitted to the optical fiber 108 away from the IC front end 102. The nanotaper 116 may have an associated length extending in the direction of propagation from a first end 118 to a second end 120. In addition, the nanotaper 116 may inversely taper or increase in width from a first end 118 to a second end 120. The first end 118 may be located at or near (e.g., a couple of microns away from) an edge 121 of the substrate 114 and/or the optical IC 104. At the first end 118, the nanotaper 116 may have a width such that the optical mode at the first end 118 matches or substantially matches the mode of the optical fiber 108 and hence supports an optical fiber mode of the optical signals received from optical fiber 108. The second end 120 may have a width that supports a waveguide mode of the optical signals in the optical waveguide structure. At the second end 120, optical signals may be confined or concentrated to the optical waveguide structure.

The nanotaper 116 may increase in width from the first end 118 to the second end 118 in various ways. In one example configuration of the nanotaper 116, as shown in FIG. 1, the width of the nanotaper 116 may have a linear profile in which the nanotaper 116 linearly increases in width from the first end 118 to the second end 120. In alternative configurations, the width of the nanotaper 116 may increase in accordance with other profiles, such as a non-linear profile (e.g., an exponential or higher-order polynomial profiles) as an example. In addition or alternatively, the nanotaper 116 may have different profiles for its two opposing longitudinally extending sides. For example, one side may linearly extend from the first end 118 to the second end 120, and the opposing side may non-linearly extend from the first end 118 to the second end 120. Additionally, for some example configurations, the nanotaper 116 may be a single-segmented structure in which the width of the nanotaper 116 may continuously increase in accordance with a single profile from the first end 118 to the second end 120, as shown in FIG. 1. In alternative configurations, the nanotaper 116 may be a multi-segmented structure in which the width of the nanotaper 116 may increase differently in accordance with different profiles over different segments of the multi-segmented nanotaper 116. Various configurations or combinations of configurations for the nanotaper 116 are possible.

Additionally, the nanotaper 116 may be an adiabatic optical waveguide structure, in which minimal energy loss occurs as the optical signals propagate over the adiabatic structure. To achieve or ensure minimal energy loss, the length of the nanotaper 116 may be sufficient to cause or enable single modal propagation of the optical signals through the nanotaper 116 with minimal or no coupling of optical energy to other optical modes or radiation modes. The length of the nanotaper 116 may be significantly greater than the wavelengths of the optical signals, and the closer in effective index the modes are, the longer the length may be. In some cases the length may be at least ten times greater than the wavelengths.

As shown in FIG. 1, the optical waveguide core 110 making up the optical waveguide path may also include a uniform waveguide portion 122 connected to the second end 120 of the nanotaper 116. The uniform waveguide portion 122 may have a substantially uniform width through which optical signals may be confined to the optical waveguide path and may be communicated between the nanotaper 116 and other portions of the optical IC 104, such as processing circuitry (not shown).

The optical fiber 108 may include a fiber optic core 124 (denoted by dots), and a fiber optic cladding 126, which may surround the fiber optic core 124. The fiber optic core 124 and cladding 126 may each be made of an optical fiber material. Example fiber optic materials may include glass or plastic, and the material used for the cladding 126 may have a lower index of refraction than the core 124, although other types of fiber optic materials and/or index of refraction configurations for either single or multimode operation, either currently existing or later developed, may be used.

As shown in FIG. 2, the optical fiber 108 may have a generally circular cross-sectional axial profile, which may be defined or determined by the cross-sectional axial shape of the fiber optic cladding 126. The fiber optic core 124 may similarly have a circular cross-sectional axial shape. Each of the fiber optic core 124 and the fiber optic cladding 126 may have an associated cross-sectional axial size, which may be defined or determined by their respective diameters.

The optical fiber 108 shown in FIGS. 1 and 2 may be single-core optical fiber of various types. For example, the optical fiber 108 may be a single-mode optical fiber that is configured to transmit optical signals in a single fiber optic mode. Example diameters for a single-mode optical fiber 108 may include a core diameter between 8 and 10.5 micrometers (μm or microns), such as 9 μm, and a cladding diameter of 125 μm, although optical fibers having other diameters may be used. Alternatively, the optical fiber 108 may include a multi-mode optical fiber configured to transmit optical signals in multiple fiber optic modes. In addition or alternatively, the optical fiber 108, either as a single-mode or a multi-mode optical fiber, may be a polarization-maintaining optical fiber (PMF). Examples of currently existing and commercially available optical fibers may include Corning® SMF28®, Corning® SMF28e®, Corning® SMF28e+®, Corning® ClearCurve®, Corning® ClearCurve® ZBL, or Fujikura PANDA polarization maintaining optical fiber, as examples. Other types of single-core optical fibers may be used. In alternative configurations, instead of being a single-core optical fiber, the optical fiber 108 may be a multi-core optical fiber configured to be optically coupled with multiple waveguide paths of the optical IC 104, as described in further detail below.

Figure 4:
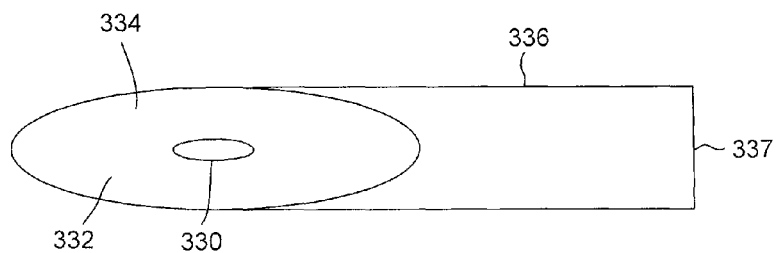
FIG. 4 illustrates perspective view of the example optical coupler in FIG. 3.

FIGS. 3-8 show various views of an example optical coupler 300 that may be configured to optically couple an optical waveguide or waveguide path of a front end of an optical IC and a fiber end of a single-core optical fiber, such as the IC front end 102 of the optical IC 104 and the fiber end 106 of the optical fiber 108 shown in FIGS. 1 and 2. FIG. 3 shows a cross-sectional side view of the optical coupler 300 taken along a central axis of the optical coupler. FIG. 4 shows a perspective view of the optical coupler 300 shown in FIG. 3 rotated 90 degrees. FIGS. 5-8 are cross-sectional axial views of the optical coupler 300 taken along lines 5-5, 6-6, 7A-7A, 7B-7B, 7C-7C, and 8-8, respectively.

The optical coupler 300 may include a fiber optic structure extending an overall longitudinal length $L_0$ from a first end 331 to a second end 333. By being a fiber optic structure, the optical fiber 300 may include a core portion 330 and a cladding portion 332. The core and cladding portions 330, 332 may be made of optical fiber materials, such as glass or plastic, which may be the same or similar to the optical fiber materials making up the core 124 and cladding 126 of the optical fiber 108 shown in FIG. 1. The optical coupler 300, being a fiber optic structure, may be formed from an optical fiber having a cladding diameter $d_0$ and a core diameter $d_1$. The cladding diameter $d_0$ may be a maximum outer diameter of the cladding portion 332 over its axial cross-section, and the core diameter $d_1$ may be a maximum outer diameter of the core portion 330 for the optical coupler 300 over its axial cross-section.

The optical coupler 300 may include a beveled portion 335 having a beveled outer surface portion 334 of an outer surface of the optical coupler 300. The beveled outer surface portion 334 may be beveled at an angle Θ relative to a longitudinal axis of the optical coupler 300. The beveled surface portion 334 may include both the core portion 330 and the cladding portion 332 of the fiber optic structure, as shown in FIGS. 3 and 4. Over the beveled surface portion 334, the core and cladding portion 330, 332 may be flush or co-planar with each other so that the beveled surface portion 334 is a substantially smooth or flat, planar surface. In addition, the beveled surface portion 334 may be an exposed outer surface in that the beveled surface portion 334 may expose the core portion 330 to outer surroundings of the optical coupler 300. As shown in FIG. 4, each of the core and cladding portions 330, 332 over the exposed beveled surface portion 334 may have an elliptical shape. The maximum lengths or transverse diameters of the core and cladding portions 330, 332 as determined over the major semi-axis of the elliptically shaped exposed beveled surface portion 334 may be determined by the core and cladding diameters $d_1$, $d_0$ and the angle $\Theta$. The maximum widths or conjugate diameters of the core and cladding portions 330, 332 as determined over the minor semi-axis of the elliptically shaped exposed beveled surface portion 334 may be equal or substantially equal to the core and cladding diameters $d_1$ and $d_0$.

Figure 5:
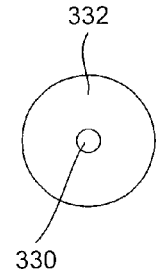
FIG. 5 illustrates a cross-sectional axial view of the example optical coupler in FIG. 3.
Figure 6:
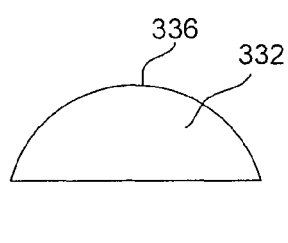
FIG. 6. illustrates a second cross-sectional axial view of the example optical coupler in FIG. 3.

The outer surface of the optical coupler 300 may also include a second exposed surface portion 337 that includes both the core portion 330 and the cladding portion 332. Similar to the beveled exposed surface portion 334, the second exposed surface portion 337 may expose the core portion 330 to outer surroundings of the optical coupler 300. Also, over the second exposed surface portion 337, the core and cladding portions 330, 332 may be flush or co-planar with each other so that the second exposed surface portion 337 is a substantially smooth or flat, planar surface. As shown in FIG. 5, each of the core and cladding portions 330, 332 over the second exposed surface portion 337 may be circularly shaped and have diameters that are equal or substantially equal to the core and cladding diameters $d_1$ and $d_0$, respectively.

The outer surface of the optical coupler 300 may further include a third surface portion 336, which may be an unexposed surface portion. The unexposed surface portion 336 may only include the cladding portion 332 and/or may not include the core portion 330. That is, over the unexposed surface portion 336, the cladding portion 332 may cover the core portion 330 or prevent the core portion 330 from being exposed to the outer surroundings of the optical coupler 300. Additionally, the unexposed surface portion 336 of the outer surface may have a shape, such as a rounded shape, that conforms to or tracks an outer surface of a cladding of an optical fiber.

As shown in FIG. 3, the beveled portion 335 of the optical coupler 300 may longitudinally extend a first length $L_1$ from the first end 331 to a second end 339. The beveled surface portion 334 may extend a second length $L_2$ from the first end 331 to the second end 339. The second length $L_2$ may be the maximum length or transverse diameter of the elliptically shaped beveled surface portion 334 shown in FIG. 4. Both the first length $L_1$ and the second length $L_2$ may depend on and/or be determined from the angle $\Theta$ and the cladding diameter $d_0$. In particular, the second length $L_2$ of the beveled surface portion 334 may be equal and/or proportional to the ratio of the cladding diameter $d_0$ to the sine of the angle $\Theta$ (sin($\Theta$)). As such, the second length $L_2$ may vary as the angle $\Theta$ varies. As the angle $\Theta$ increases (i.e., moves toward 90 degrees), the second length $L_2$ decreases. Conversely, as the angle $\Theta$ decreases (i.e., moves toward 0 degrees), the second length $L_2$ increases. The longitudinal first length $L_1$ over the beveled portion 335 may depend on and be directly proportional to the second length $L_2$, and so may similarly vary with the second length $L_2$ as the angle $\Theta$ varies.

Over the longitudinal first length $L_1$, an axial cross-section perpendicular to the longitudinal axis may change in height, cross-sectional shape, and compositional makeup of the core and cladding portions 330, 332. Over each axial cross-section, the height may be determined or defined by a maximum distance between the beveled surface portion 334 and the unexposed surface portion 336 that extends perpendicular to the exposed surface portion 336. The height may vary linearly proportional to the angle $\Theta$. At the first end 331, the height may be at a minimum, where the beveled surface portion 334 and the unexposed surface portion 336 may converge to a point. At the second end 339, the height may be at a maximum, where the height may be equal to the cladding diameter $d_0$.

Also, over the longitudinal length $L_1$, the axial cross-sections may change cross-sectional shape from the first end 331 to the second end 339. At the first end 331, the beveled exposed surface portion 334 and the unexposed surface portion 336 may converge to a point, as previously described. At the second end 339, the axial cross section may be completely circular, as shown in FIG. 8. In between the first and second ends 331 and 339, the beveled exposed surface portion 334 and the unexposed surface portion 336 may combine to form an outer surface of the optical coupler 300 having an axial cross section that is semi-circular, as shown in FIGS. 6 and 7A-7C.

In addition, the composition of the core and cladding portions 330, 332 making up the semi-circular cross-sections may vary over the longitudinal length $L_0$. For example, some axial cross-sections may include only the cladding portion 332, as exemplified in the axial cross-section shown in FIG. 6. Other axial cross-sections may include both the core portion 330 and the cladding portion 332, as exemplified in the axial cross-section shown in FIG. 7A-7C.

The beveled portion 335 may longitudinally extend a third length $L_3$ over which the core portion 330 is part of the beveled surface portion 334, from a first end 341 to a second end 343. The core portion 330 may extend a fourth length $L_4$ over the beveled surface portion 334, from the first end 341 to the second end 343. Both the third length $L_3$ and the fourth length $L_4$ may depend on and/or be determined from the angle $\Theta$ and the core diameter $d_1$. In particular, the fourth length $L_4$ may be equal and/or proportional to the ratio of the core diameter $d_1$ to the sine of the angle $\Theta$ (sin($\Theta$)). As such, the fourth length $L_4$ may vary as the angle $\Theta$ varies. As the angle $\Theta$ increases (i.e., moves toward 90 degrees), the fourth length $L_4$ decreases. Conversely, as the angle $\Theta$ decreases (i.e., moves toward 0 degrees), the fourth length $L_4$ increases. The longitudinal third length $L_3$ depends on and is directly proportional to the fourth length $L_4$, and so may similarly vary with the fourth length $L_4$ as the angle $\Theta$ varies.

Figure 7A:
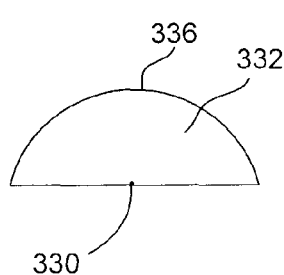
FIG. 7A illustrates a third cross-sectional axial view of the example optical coupler in FIG. 3.
Figure 7B:
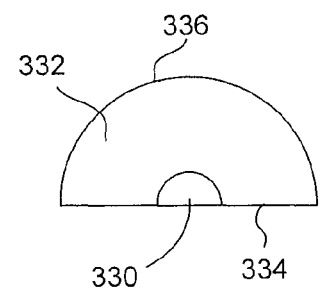
FIG. 7B illustrates a fourth cross-sectional axial view of the example optical coupler in FIG. 3.
Figure 7C:
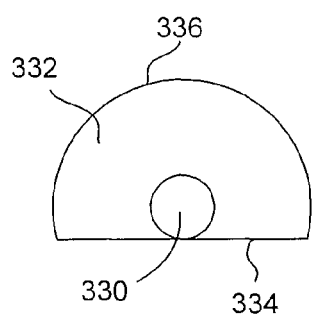
FIG. 7C illustrates a fifth cross-sectional axial view of the example optical coupler in FIG. 3.
Figure 8:
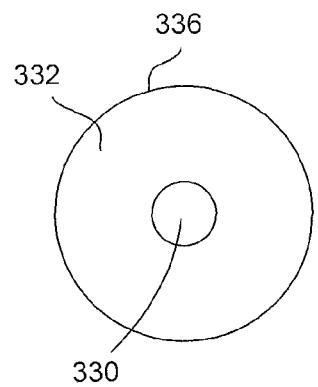
FIG. 8 illustrates a sixth cross-sectional axial view of the example optical coupler in FIG. 3.

As shown in FIGS. 7A-7C, the core portion 330 may vary in a cross-sectional height and shape over the third length $L_3$. Like the overall height of the optical coupler 300, the cross-sectional height of the core portion 330 may linearly vary in accordance with the angle $\Theta$. In addition, over the third length $L_3$, the core portion 330 may have a cross-sectional shape that transitions from a point at the first end 341 (FIG. 7A), to being semi-circular in between the first end 341 to the second end 343 (FIG. 7B), to being fully circular at the second end 343 (FIG. 7C). Is this way, over the third and fourth lengths $L_3$, $L_4$, the core portion 330 may form a semi-conical structure.

The optical coupler 300 may further include a uniform portion 338 connected to and/or formed integral to the beveled portion 335. The uniform portion 338 may have a uniform axial cross-section over a longitudinal length $L_5$, from the second end 333 of the optical coupler 300 to the second end 339 of the beveled surface portion 334, where the uniform portion 338 is connected to the beveled portion 335. FIGS. 5 and 8 show the axial cross section of the optical coupler 300 being uniform over the longitudinal length $L_5$.

Figure 9:
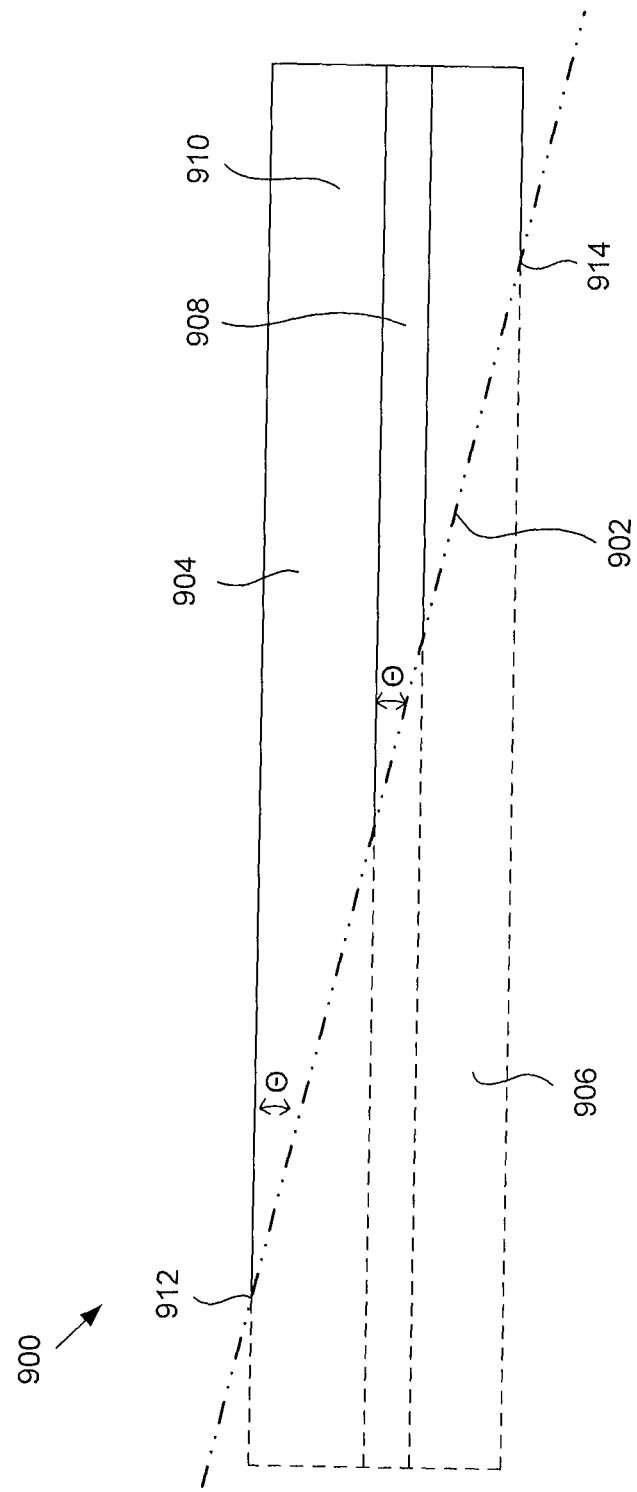
FIG. 9 illustrates a side view of an optical coupler formed from an optical fiber.

As previously described, the optical coupler 300 may be formed from and/or be a part of an optical fiber. To illustrate, FIG. 9 shows a cross-sectional side view of a fiber end 900 of an optical fiber. Dotted line 902 in FIG. 9 divides the end 900 into a first portion 904 and a second portion 906. The first portion 904 is shown using solid lines to denote the portion of the optical fiber used for the optical coupler 300 shown in FIGS. 3-8. The second portion 906 is shown using dotted lines to denote a remaining, unwanted portion that may not be used for the optical coupler 300. The angle Θ described above with reference to FIGS. 3-8 may be an angle that is formed relative to a longitudinal axis of the optical fiber end 900. As shown in FIG. 9, the dotted line 902 dividing the first and second portions 904, 906 may extend through core and cladding portions 908, 910 of the optical fiber from a first end 912 to a second opposing end 914 at the angle Θ relative to the longitudinal axis of the optical fiber end 900. An example process of making the optical coupler, including removal of the second unwanted portion 906 from the first portion 904 used for the optical coupler is described in further detail below.

After the second, unwanted portion 906 is removed from the first portion 904, the optical coupler 300 having the three outer surface portions 334, 336, and 337 shown in FIG. 3 may result. Further portions of the optical coupler 300 may be removed to form various alternative embodiments of the optical coupler 300. In particular, portions beginning from the first end 331 and/or the second end 333 of the optical coupler 300 may be removed, which may reduce an overall size of the optical coupler 300, including a reduction in the overall length $L_0$ of the optical coupler 300 and/or the first through fifth lengths $L_1$ to $L_5$ associated with the beveled portion 335 and the beveled surface portion 334; modify shapes, sizes and core and cladding compositional makeup of the beveled surface portion 334 and/or second exposed surface portion 337; modify orientations of the beveled surface portion 334 and the second exposed surface portion 337 relative to each other; and/or form additional outer surface portions. Other modifications to the optical coupler 300 may result when the further portions of the optical coupler are removed.

Looking at FIG. 3 in particular, to remove a first further portion of the optical coupler 300 beginning from the first end 331, a first point or position along the beveled surface portion 334 from the first end 331 may be determined. The first position may be within a range of possible positions that extends along the beveled surface portion 334 between the first end 331 of the optical coupler 300 and the second end 343 of the core portion of 330. After the first position in the range is determined, the first further portion to be removed may be defined by a first line segment extending from the first end 331 to the first position along the beveled surface portion 334, and by a second line segment extending from the first position on the beveled surface portion 334 to a second point or position on the unexposed surface portion 336. The first further portion of the optical coupler 300 defined by the first and second line segment may then be removed, which may form a fourth outer surface portion adjacent to the beveled surface portion 334 and the unexposed surface portion 336. In some example configurations, the second line segment may extend perpendicular to the beveled surface portion 334, so that the fourth outer surface portion, in turn, may be oriented perpendicular to the beveled surface portion 334.

Although the range in which the first position is determined extends to the second end 343 of the core portion 330, the first position is preferably determined so that at least some amount, if not all, of the core portion 330 along the fourth length $L_4$ remains after the first further portion is removed. In some configurations, that amount may be determined so that the optical coupler forms an adiabatic system with the optical waveguide to which it is coupled, as described in further detail below. Also, depending on where the first position along the beveled surface portion is determined, the fourth outer surface portion may include only the cladding portion 332 or alternatively, may include a combination of the core and cladding portions 330, 332. For example, if the first position is determined in between the first end 331 of the optical coupler 300 and the first end 341 where the core portion 330 begins, then the fourth surface portion may include only the cladding portion 332. Alternatively, if the first position is determined at the first end 341, then the fourth surface portion may include substantially all of the cladding portion 332, with a relatively small or negligible amount of the core portion 330. Alternatively, if the first position is determined in between the first and second ends 341, 343 of the core portion 330, then the fourth surface portion may include both core and cladding portions 330, 332. Also, for these alternative configurations, the core portion 330 at the fourth surface portion may have a semi-circular cross-sectional shape.

In addition or alternatively, a second further portion may be removed from the optical coupler 300 beginning from the second end 333. The second further portion of the optical coupler 300 that may be removed may include all or some of the uniform portion 338. In addition or alternatively, a third point or position along the beveled surface portion 334 may be determined to remove all or some of the second further portion. The third position may be within a range of possible positions that extends along the beveled surface portion 334 between the second end 339 of the beveled surface portion and the second end 343 of the core portion of 330 that is part of the beveled surface portion 334. After the third position in the range is determined, the second further portion to be removed may be defined by a third line segment extending from the second end 339 to the third position along the beveled surface portion 334, and by a fourth line segment extending from the third position on the beveled surface portion 334 to a fourth point or position on the unexposed surface portion 336. The second further portion of the optical coupler 300 defined by the third and fourth line segments may then be removed. When the second further portion is removed, the orientation of the second exposed surface portion 337 may be changed such that the second exposed surface portion 337 is adjacent to the beveled surface portion 334 at the third position along the beveled surface portion 334. In some example configurations, the fourth line segment may extend perpendicular to the beveled surface portion 334, so that the orientation of the second exposed surface portion 337 is oriented perpendicular to the beveled surface portion 334.

The axial cross-sectional shape and the compositional makeup of the core and cladding portions 330, 332 at the second exposed surface portion 337 may vary; depending on how much of the second further portion is removed. For example, if only the uniform portion 338 of the optical fiber 300 is removed, the axial cross-section of the optical coupler 300 may be fully rounded, such as completely circular, as shown in FIG. 8. Alternatively, if more of the second further portion than the uniform portion 338 is to be removed and the third position along the beveled surface portion 334 is determined, then the axial cross-section of the optical coupler 300 over the second exposed surface portion 337 may be partially rounded or semi-circular, as a part of the axial cross-sectional shape will include the flat, planar surface of the beveled surface portion 334. Also, as the distance along the beveled surface portion 334 between the second end 339 and the third position increases, the amount of the cladding portion 332 surrounding the core portion 330, including the amount of the cladding portion 332 separating core portion 330 from the beveled surface portion 334, may decrease. For example configurations where the third position is determined at the second end 343 of the core portion 330, there may be no separation between the core portion 330 and the beveled surface portion 334, and the core portion 330 may be substantially tangential with and form part of the beveled surface portion 334 at the second exposed surface portion 337, as shown in FIG. 7C.

FIGS. 10-21 show cross-sectional side views taken along a central axis and corresponding cross-sectional axial views of various example alternative configurations of the optical coupler 300 when various amounts of a first further portion and/or a second further portion are removed from the optical coupler 300. FIGS. 10-15 show alternative example optical couplers when different amounts of a second further portion, beginning from the second end 333, are removed. FIGS. 16-21 show alternative example optical couplers when different amounts of a first further portion, beginning from the first end 331, are removed. In all of these alternative embodiments, the core and cladding portions remain angled fiber optic structures at the angle Θ.

The alternative example optical coupler 1000 shown in FIGS. 10 and 11 may be formed from the optical coupler 300 when a part of the uniform portion 338 may be removed, which may modify the second exposed surface portion 337 to form an alternative second exposed surface portion 1037. The second exposed surface portion 1037 may be adjacent and oriented perpendicular to a beveled surface portion 1034, which may be beveled at the angle Θ. Also, an axial cross-sectional shape of the optical coupler 1000 at the second exposed portion 1037 may be completely round, such as elliptical or circular, as shown in FIG. 11. In addition, for the example optical coupler 1000, at the first end 1031, the beveled surface portion 1034 and an unexposed surface portion 1036 may converge to a point.

The alternative example optical coupler 1200 shown in FIGS. 12 and 13 may be similar to the alternative optical coupler 1000, except that additional material may be removed from the optical coupler 1000. In particular, in view of FIGS. 10 and 12, a position 1239 along the beveled surface portion 1034 may be determined, and a corresponding portion may be removed from the optical coupler 1000 to form a second exposed surface portion 1237 and a beveled surface portion 1234 of the optical coupler 1200 shown in FIGS. 12 and 13. Also, the optical coupler 1200 at the second exposed surface portion 1237 may have a semi-circular axial cross-section, as shown in FIG. 13, as the flat, planar surface of the beveled surface portion 1234 may be part of the axial cross-section. Additionally, as shown in FIG. 10, the position 1239 along the beveled surface portion 1034 may be in between the second end 1039 of the beveled surface portion 1034 and a position 1439, which may correspond to the second end 343 of the core portion 330 shown in FIG. 3. As a result, the cladding portion 1232 may separate the core portion 1230 from the beveled surface portion 1234 over the axial cross-section at the second exposed surface portion 1237, as shown in FIG. 13.

The alternative example optical coupler 1400 shown in FIGS. 14 and 15 may be similar to the alternative optical couplers 1000 and 1200, except that instead of the position 1239 being determined to form the optical coupler 1200, an alternative position 1439 may be determined along the beveled surface portion 1034 to form a second exposed surface portion 1437 and a beveled surface 1434 of the alternative example coupler 1400. As previously described, the alternative position 1439 may correspond to the second end 343 of the core portion 330 shown in FIG. 3. As a result, a fully-rounded, such as fully circular or a fully elliptical, core portion 1430 over the second exposed surface portion 1437 may be tangential or substantially tangential to the beveled surface portion 1434, as shown in FIG. 15.

FIGS. 16-21 show other alternative example optical couplers 1600, 1800, 2000 when different amounts of a portion of the optical coupler 300, beginning from the first end 331, are removed. The optical couplers 1600, 1800, 2000 are configured to have second exposed surface portions 1637, 1837, 2037 configured similarly to the second exposed surface portion 1437 of the optical coupler 1400 shown in FIGS. 14 and 15. However, other configurations for the second exposed surface portions 1637, 1837, and/or 2037, such as those for the example optical couplers 300, 1000, or 1200 may be alternatively used.

With reference to FIGS. 3 and 16, the alternative example optical coupler 1600 may be formed from a determined point or position 1642 along the beveled surface portion 334 in between the first end 331 of the beveled surface portion 334 and the first end 341 of the core portion 330 to form a beveled surface 1634 and a fourth surface portion 1640 of an outer surface of the optical coupler 1600. The fourth surface portion 1640 may be adjacent to the beveled surface portion 1634 and oppose the exposed surface portion 1637, in which the optical coupler 1600 may longitudinally extend from the fourth surface portion 1640 to the second exposed surface portion 1637. Additionally, as shown in FIG. 16, the fourth surface portion 1640 may be oriented perpendicular to the beveled surface portion 1634, although other orientations are possible. As shown in FIG. 16, the fourth surface portion 1640 and the second exposed surface portion 1637 may both be oriented perpendicular or substantially perpendicular to the beveled surface portion 1634, and as such, may be oriented parallel or substantially parallel to each other. As shown in FIG. 17, an axial cross section of the optical coupler 1600 at the fourth surface portion 1640 may be semi-circular. Also, because the position 1642 was in between the ends 331 and 341 of the optical coupler 300, the compositional makeup of the fourth surface portion 1640 may include only a cladding portion 1632, as shown in FIG. 17.

With reference to FIGS. 3 and 18, the alternative example optical coupler 1800 may be formed from a determined point or position 1842 along the beveled surface portion 334 at the first end 341 of the core portion 330 to form a beveled surface portion 1834 and a fourth surface portion 1840. Because the determined position 1842 is at the first end 341, the fourth surface portion 1840 may include mostly a cladding portion 1832, and a relatively small or negligible amount, of a core portion 1830, as shown in FIG. 19.

With reference to FIGS. 3 and 20, the alternative example optical coupler 2000 may be formed from a determined point or position in between the first end 341 and the second end 343 of the core portion 330 to form a beveled surface portion 2034 and a fourth surface portion 2040. Because the determined position 2042 is in between the first end 341 and the second end 343, the fourth surface portion 2040 may include both a core portion 2030 and a cladding portion 2032. In addition, as shown in FIG. 21, the core portion 2030 at the fourth surface portion 2040 may have a partially rounded or semi-circular cross-section.

The various optical couplers shown in FIGS. 3-21 are non-limiting examples of optical couplers that may be formed from a fiber optic structure having a beveled surface at an angle Θ. Other optical couplers, including optical couplers having different combinations of the features shown in FIGS. 3-21, may be formed in accordance with the above description.

A beveled exposed surface portion of an optical coupler, such as those shown in FIGS. 3-21, may be positioned and oriented relative to an optical waveguide to optically couple the optical coupler with the optical waveguide. In particular, the optical coupler may be positioned over the optical waveguide such that the beveled exposed surface portion faces and is substantially parallel to the core of the optical waveguide. Additionally, the second exposed surface portion of the optical coupler, such as those shown in FIGS. 3-21, may be used to optically couple the optical coupler with a single-core optical fiber. In particular, the second exposed surface portion may face and be butt coupled with an end of the optical fiber.

Figure 22:
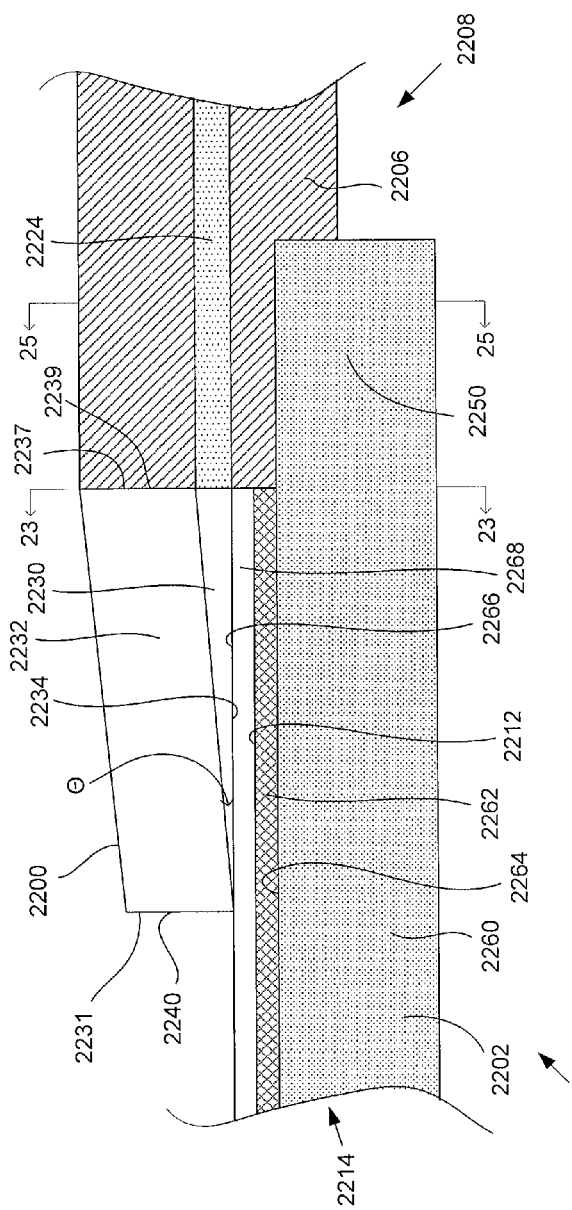
FIG. 22 illustrates a cross-sectional side view of an example optical system.

FIG. 22 shows a partial cross-sectional side view of an optical system that includes an optical coupler 2200 optically coupled with an optical waveguide of an IC front end 2202 of an optical IC 2204 and a fiber end 2206 of an optical fiber 2208. The optical coupler 2200 shown in FIG. 22 has the configuration of the example optical coupler 1800 shown in FIG. 18, although other optical couplers configured in accordance with those shown and described above with reference to FIGS. 3-21 may be used.

The IC front end 2202 of the optical IC 2204 may be a generally planar structure that includes one or more planar layers disposed and/or deposited on top of one another. The planar layers may include a top layer 2268 that includes at least a core of the optical waveguide with which the optical coupler 2200 may be optically coupled. The top layer 2268 may be disposed on a top surface 2212 of the other or non-top layers of the planar structure. The other or non-top layers may be generally referred to as the substrate or substrate layers 2214.

The layers of the front end 2202 of the optical IC may be configured in accordance with one of various material technologies or systems used for optical waveguides and optical integrated circuits. In some example configurations, the layers may be configured in accordance with silicon on insulator (SOI), which may be formed using complementary metal-oxide-semiconductor (CMOS) fabrication techniques or SOITEC Smart Cut™ process.

In accordance with SOI, the layers of the IC front end 2202 may include a first, base layer 2260 and a second, buried oxide (BOX) layer 2262 disposed on a top planar surface 2264 of the base layer 2260. The base layer 2260 may be made of silicon (Si), and the BOX layer 2262 may be made of an oxide material, such as silicon dioxide ($SiO_2$). For purposes of the present description, the base and BOX layers 2260, 2262 may be referred to as the substrate layers 2214 when the IC front end 2202 is configured for SOI. The top layer 2268 may be disposed on a top surface 2212 of the BOX layer 2262. The top layer 2268 may include the core of the optical waveguide, which in accordance with SOI, may be an etched layer of silicon that is disposed on the top surface 2212 of the BOX layer 2262.

To integrate the optical coupler 2200 with the IC front end 2202, the optical coupler 2200 may be positioned over the top layer 2268. In particular, a beveled surface portion 2234 of the optical coupler 2200 may face and be disposed on a top surface 2266 of the top layer 2268. When the beveled surface portion 2234 is disposed on the top surface 2266 as shown in FIG. 22, the optical coupler 22 may be optically coupled with the optical waveguide.

The core of the optical waveguide may be included as a sub-layer or portion of the top layer 2268. In addition to the core, the top layer 2268 may include an adhesive sub-layer or portion and/or a cladding sub-layer or portion. The adhesive portion may be used to affix the optical coupler 2200 to the IC front end 2202. The adhesive portion may include an epoxy, such as an optically transparent epoxy, or other type of adhesive material. The cladding portion may be an additional component of the optical waveguide structure that at least partially surrounds or encases the core to confine optical signals to the core as they propagate along the waveguide path.

FIGS. 23A-23G show cross-sections of the optical system of FIG. 22 along the line 23-23, illustrating various example configurations of the top layer 2268. All of the configurations include a core 2310 of the top layer 2268 disposed on the top surface 2212 of the BOX layer 2262. FIGS. 23A-23G illustrate various ways in which adhesive and/or cladding portions may be integrated with the core to form an optical waveguide and affix the optical coupler 2200 to the top layer 2268.

Figure 23A:
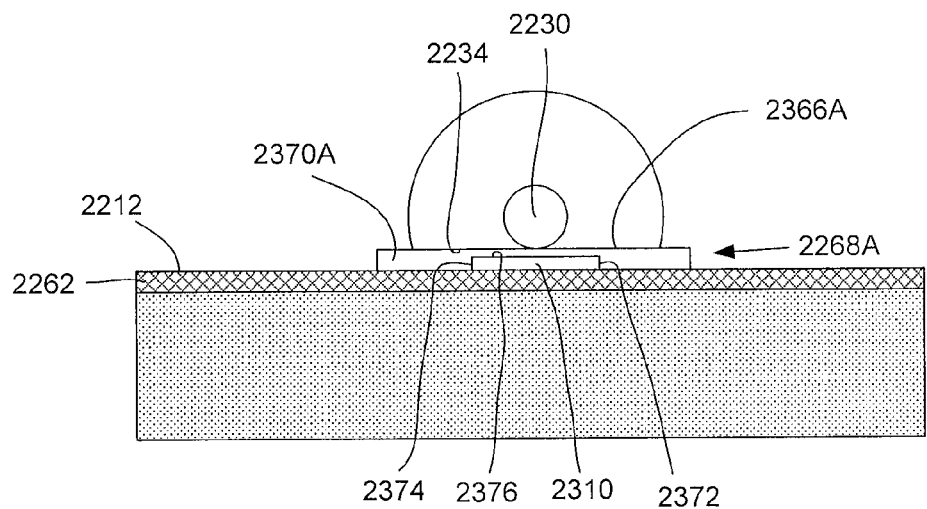
FIG. 23A illustrates a cross-sectional axial view of the example optical system in FIG. 22, showing an example embodiment of a top layer of optical system.

In one example configuration of the top layer 2268 shown in FIG. 23A, a top layer 2268A may include an adhesive portion 2370A that is disposed around longitudinally extending sides 2372, 2374 and a top surface 2376 of the core 2310. The beveled surface portion 2234 may be disposed on and be in contact with a top surface 2366A, which may include only the adhesive portion 2370A. Additionally, as shown in FIG. 23A, the adhesive portion 2370A may separate a core portion 2230 of the optical coupler 2200 and the top surface 2376 of the core 2310.

Figure 23B:
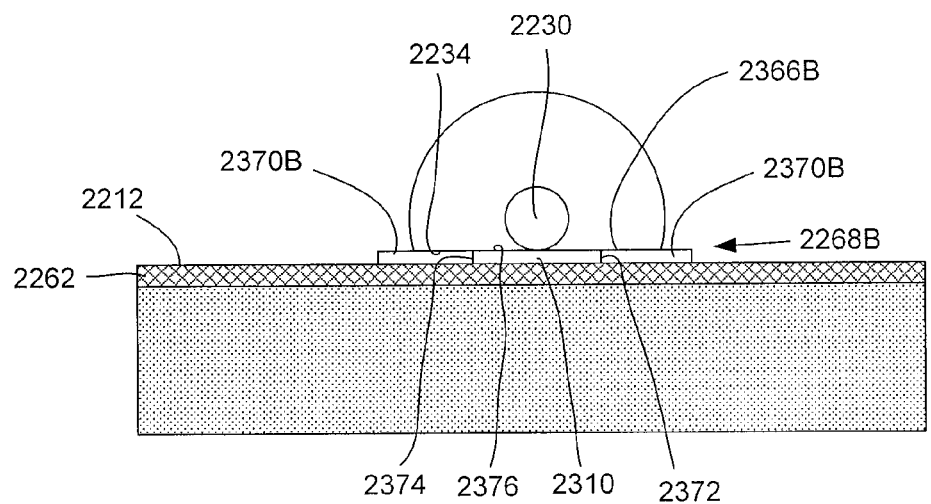
FIG. 23B illustrates another cross-sectional axial view of the example optical system in FIG. 22, showing an alternative example embodiment of the top layer.

In another example configuration of the top layer 2268 shown in FIG. 23B, a top layer 2268B may include an adhesive portion 2370B that is disposed around or adjacent to the sides 2372, 2374 but not the top surface 2376 of the core 2310. In this way, the top surface 2366B may include both the core and adhesive portion. When the optical coupler 2200 is disposed on the top layer 2268B, the core portion 2230 may be in direct contact with the top surface 2376 of the core 2310, and the adhesive portion 2370B on both sides 2372, 2374 of the core 2310 may affix the optical coupler 2200 to the top layer 2268B.

Figure 23C:
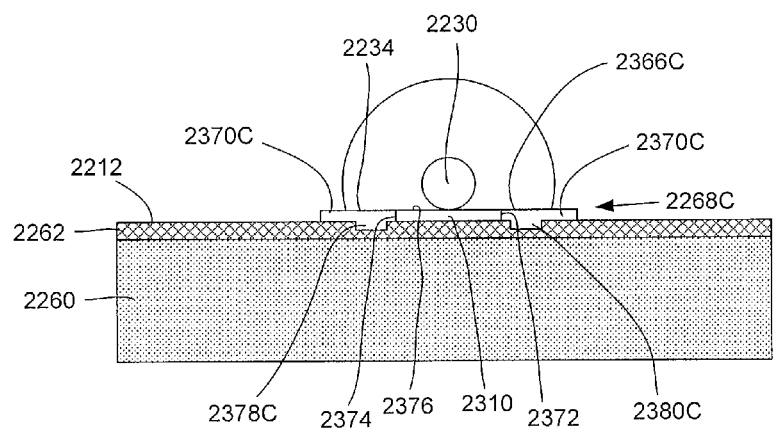
FIG. 23C illustrates another cross-sectional axial view of the example optical system in FIG. 22, showing a second alternative example embodiment of the top layer.

In another example configuration of the top layer 2268 shown in FIG. 23C, an adhesive portion 2370C of a top layer 2268C may be adjacent to the sides 2372, 2374, and may also extend into and/or at least one trench, such as a pair of trenches 2378C, 2380C that may be formed in the BOX layer 2262. The trenches 2378C, 2380C may be formed in the BOX layer 2262 and filled or added with adhesive material to provide an extra thickness or increased bond line for the adhesive portion, which in turn may enhance the adhesive bond between the top layer 2268C and the optical coupler 2200. The trenches 2378C, 2380C may longitudinally extend parallel or substantially parallel with the sides 2372, 2374 of the core 2310 over at least a part of the length of the top layer 2268C over which the optical coupler 2200 may be disposed. Also, FIG. 23C shows the trenches 2378C, 2380C extending partially through the BOX layer 2262. In alternative configurations, the trenches 2378C, 2380C may extend completely through the BOX layer 2262 and/or into the base layer 2260. Additionally, the trenches 2378C, 2380C may be formed using planar lithography and etching techniques. One example etching technique used to form the trenches 2378C, 2380C may be deep reactive ion etching (DRIE), although other etching techniques may be used.

Figure 23D:
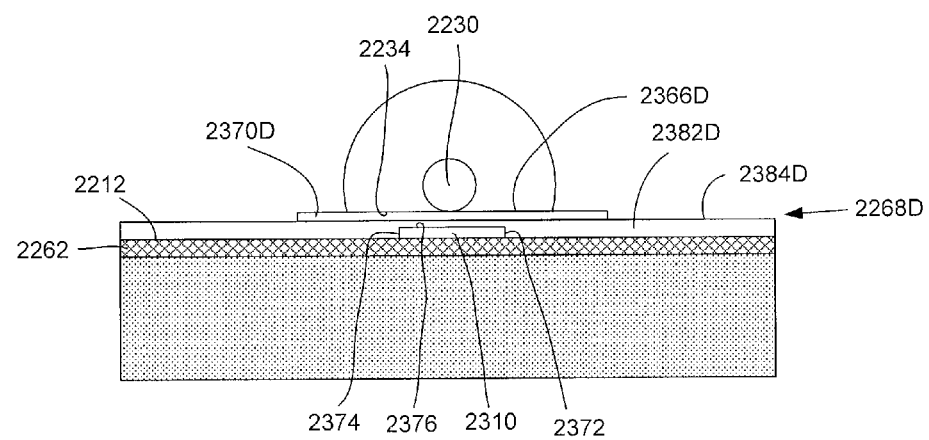
FIG. 23D illustrates another cross-sectional axial view of the example optical system in FIG. 22, showing a third alternative example embodiment of the top layer.

In another example configuration of the top layer 2268 shown in FIG. 23D, a top layer 2268D may include a cladding 2382D surrounding and/or adjacent to the sides 2372, 2374 and the top surface 2376 of the core 2310. An adhesive portion 2370D may be applied to a top surface 2384D of the cladding 2382D. In this way, the adhesive portion 2370D may be included as a top sub-layer of the top layer 2268D. The beveled surface portion 2234 may be disposed on the adhesive portion 2370D to be affixed to the IC front end 2202. For the example configuration shown in FIG. 23D, the core 2310 may be separated from the core portion 2230 of the optical coupler 2200 by both the adhesive layer 2370D and the cladding 2382D of the top layer 2268D.

Figure 23E:
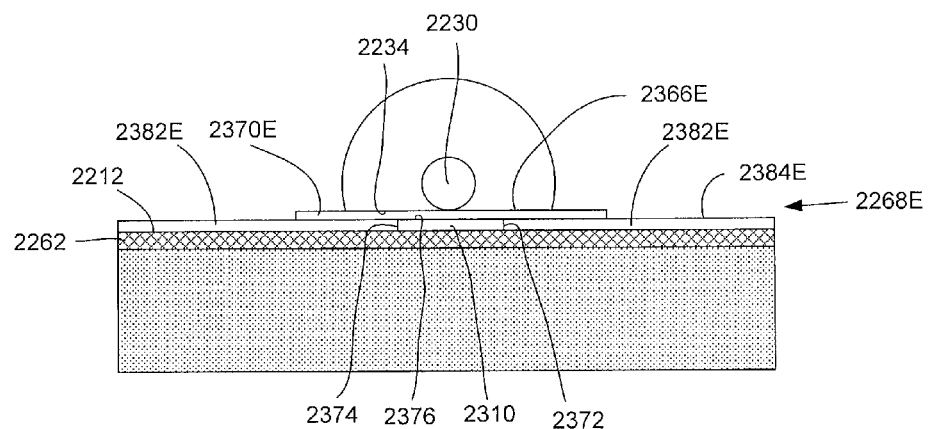
FIG. 23E illustrates another cross-sectional axial view of the example optical system in FIG. 22, showing a fourth alternative example embodiment of the top layer.

In another example configuration of the top layer 2268 shown in FIG. 23E, a cladding 2382E of a top layer 2268E may be disposed around and/or be adjacent the sides 2372, 2374 of the core, and a top surface 2384E of the cladding 2382E may be co-planar or substantially co-planar with the top surface 2376 of the core 2310. Similar to the configuration shown in FIG. 23D, an adhesive portion 2370E may be included as a top sub-layer of the top layer 2268E and disposed over the top surfaces 2376, 2384E of the core 2310 and cladding 2382E, respectively. The beveled exposed surface portion 2234 may be disposed on 2370E to be affixed to the IC front end 2202.

Figure 23F:
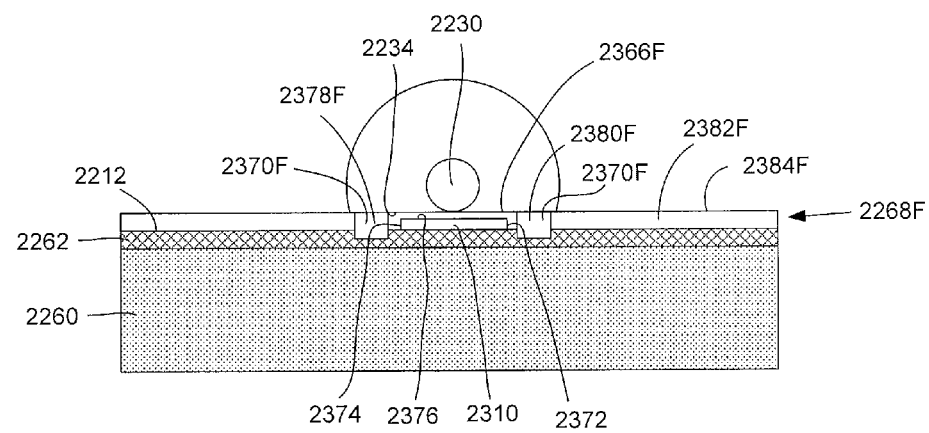
FIG. 23F illustrates another cross-sectional axial view of the example optical system in FIG. 22, showing a fifth alternative example embodiment of the top layer.

In another example configuration of the top layer 2268 shown in FIG. 23F, a top layer 2268F may include trenches 2378F and 2380F that may be formed in a cladding 2382F and extend into the BOX layer 2262. The trenches 2378F, 2380F may be filled with adhesive 2370F to affix the beveled surface portion 2234 of the optical coupler 2200 to a IC front end 2202. As shown in FIG. 23F, the trenches 2378F, 2380F may extend completely through the cladding 2382F, from the top surface 2384F of the cladding and partially through the BOX layer 2262. In alternative example configuration, the trenches 2378F, 2380F may extend only partially through the cladding 2382F. Alternatively, the trenches 2378F, 2380F may extend completely through both the cladding 2382F and the BOX layer 2262 and/or into the base layer 2260. The trenches 2378F, 2380F may be formed using planar lithography and etching techniques, such as DRIE, as previously mentioned. In addition or alternatively, one or more cutting techniques may be used to cut through the cladding 2382 to form at least the portions of the trenches 2378F, 2380F that extend through the cladding 2382F. Additionally, the top layer 2268F is shown to include trenches 2378F, 2380F for a core/cladding configuration where the cladding 2382F surrounds the sides 2372, 2374 and the top surface 2376 of the core 2310. In this way, the top surface 2366F of the top layer 2268F, may include both the top layer 2384F and an adhesive portion 2370F filled in the trenches 2378F, 2380F.

Figure 23G:
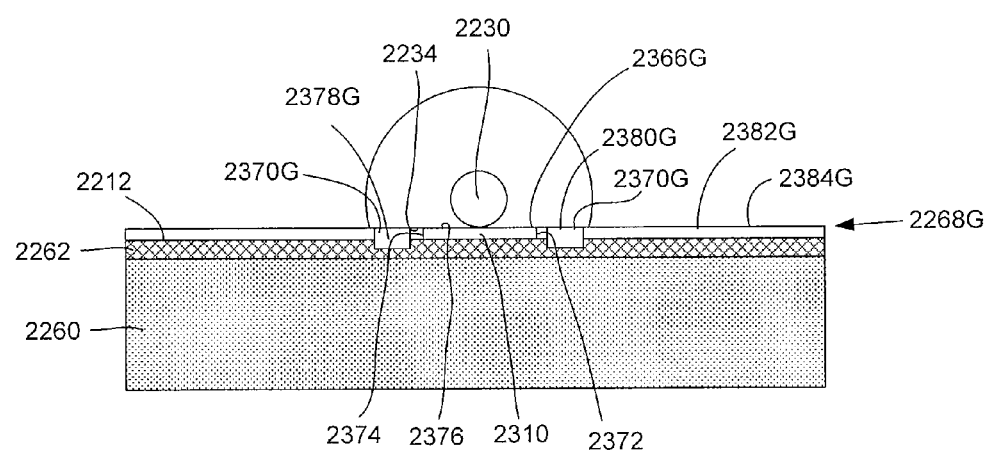
FIG. 23G illustrates another cross-sectional axial view of the example optical system in FIG. 22, showing a sixth alternative example embodiment of the top layer.

In another example configuration of the top layer 2268 shown in FIG. 23G, trenches 2378G, 2380G filled with adhesive material may be used for a core/cladding configuration where a top surface 2384G of cladding 2382G is co-planar with the top surface 2376 of the core 2310, and the cladding 2382G does not surround the top surface 2376 of the core 2310. For this example configuration, the top surface 2366G of the top layer 2268G may include core, cladding, and adhesive portions that are flush or co-planar with each other. As shown in FIG. 23G, the core portion 2230 of the optical coupler 2200 may be in direct contact with the core 2310.

The example configurations of the top layer 2268F and 2268G are shown using trenches instead of a top adhesive sub-layer to affix the optical coupler 2200 to the IC front end 2202. In alternative configurations, the trenches may be used in combination with a top adhesive sub-layer, such as the top adhesive sub-layers 2370D and 2370E used for the configurations shown in FIGS. 23D and E. The combination of the trenches and the top adhesive sub-layer may be used for the core/cladding configuration where the cladding surrounds the top surface 2376 of the core 2310 and/or for the core/cladding configuration where the top surface of the cladding is co-planar with the top surface 2376 of the core 2310

The cross-sections shown in FIGS. 23A-23G are non-limiting example configurations of a top layer 2368 for the IC front end 2202 that includes a core of an optical waveguide in combination with various configurations of an adhesive portion used to affix the optical coupler 2200 to the IC front end 2202 and an optional cladding portion. Other configurations or combinations of the configurations of the top layer 2368 shown in FIGS. 23A-23O may be possible.

Additionally, FIGS. 23A-23G show the core 2310 as a single-layer structure. However, in alternative configurations, the core 2310 may be a multi-layer structure, such as a double-layer structure. For example, the core may be formed by a partial etching, instead of a complete etching, of a silicon layer disposed on the top surface 2212 of the BOX layer 2262. A thinner layer of silicon formed from the partial etch may remain disposed over the BOX layer 2262, which may be the first layer, and the core forming the waveguide path may be the second layer. In another alternative configuration, the core may include a ribbed structure disposed on a base layer, which may be a nanotaper or uniform waveguide portion determining the waveguide path. The ribbed and base layers may be made of the same or different materials, such as silicon and polycrystalline (polysilicon) or silicon nitride ($Si_3N_4$), as examples.

In addition, as shown in FIGS. 23A-23G, when the optical coupler 2200 is positioned over the core 2310, the core portion 2230 of the optical coupler 2200 may be axially aligned with the core 2310.

Figure 24:
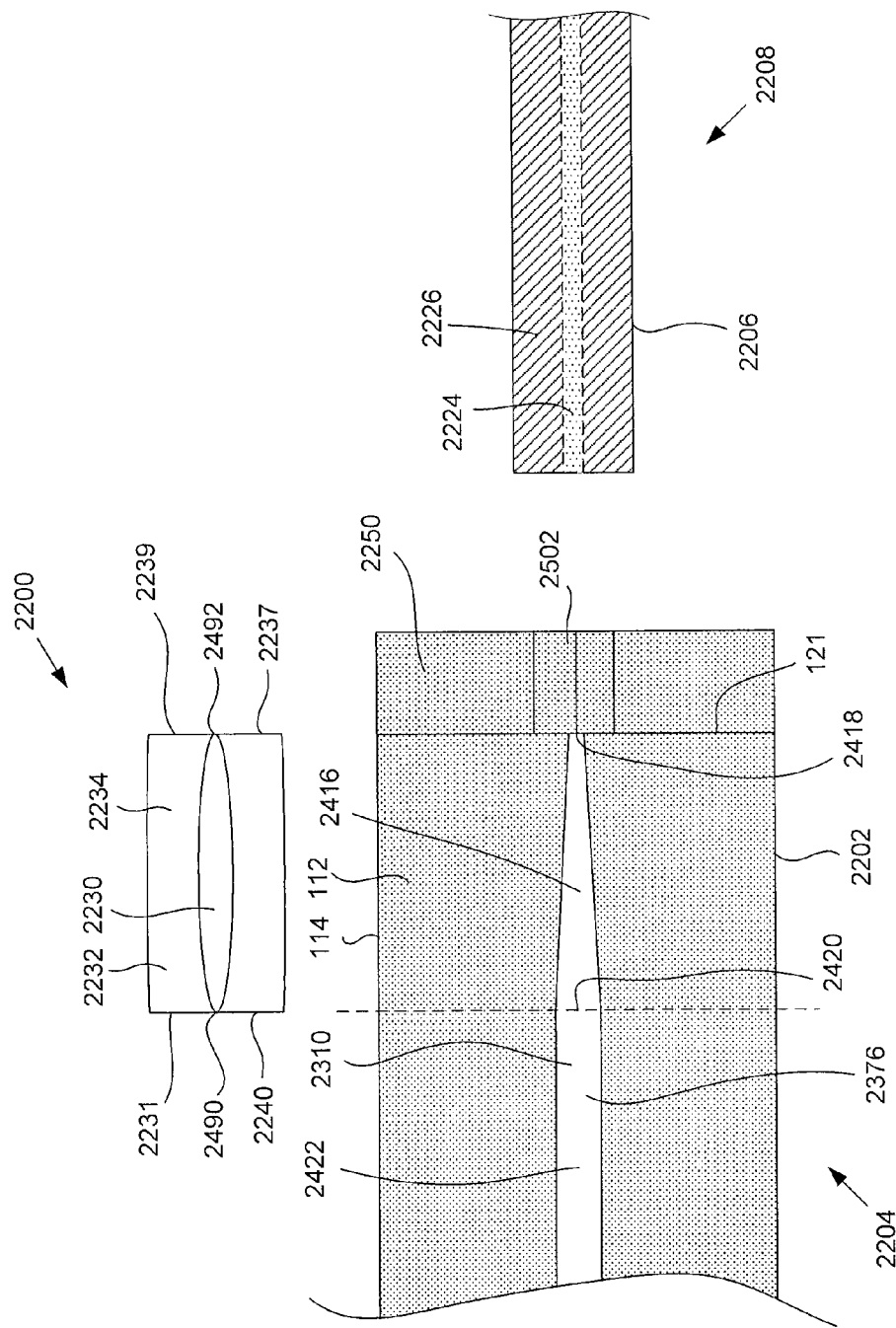
FIG. 24 illustrates an exploded view of the example optical system in FIG. 22.

Further, when positioned over the core 2310, the beveled surface portion 2234, including the core portion 2230 of the beveled surface portion, may be longitudinally aligned with a nanotaper portion of the core 2310. FIG. 24 shows an exploded view of the optical system shown in FIG. 22, with the optical coupler 2200 and the IC front end 2202 rotated ninety degrees, so that the surfaces of the optical coupler 2200 and the IC front end 2202 that face each other (i.e., the beveled surface portion 2234 and the top surface 2376 of the core 2310) are shown. The core 2310 may include a nanotaper 2416 connected to uniform waveguide portion 2422, which may be similar to the nanotaper 116 and uniform waveguide portion 122 shown in FIG. 1. The nanotaper 2416 may extend a longitudinal length and increase in width over the longitudinal length from a first end 2418 to a second end 2420.

In some example configurations, when the optical coupler 2200 is positioned over the nanotaper 2416, the optical coupler 2200 and the nanotaper 2416 may form an adiabatic system or a combined adiabatic optical structure. Some or all of the dimensions and/or material properties of the optical coupler 2200 and/or the core 2310, including the nanotaper 2416, may depend on each other or chosen relative to each other. Further, the dimensions and/or properties may be determined in accordance with optical criteria. For example, the width of the nanotaper 2416 at the larger-width end 2420, the shorter-width end 2418 and the profile of the tapering between the two ends 2418, 2420 may be chosen such that an effective index of the mode at the larger-width end 2420 of the nanotaper 2416 may be greater than the index of the core portion 2230 at the first end 2231, such that the mode is predominantly confined in the nanotaper 2416 of the optical waveguide of the IC front end 2202. Additionally, the width of the nanotaper 2416 at the smaller-width end 2418 may be determined such that the effective index of an overall mode of the nanotaper 2416 and the optical coupler 2200 combined adiabatically decreases to a value that may be less than the index of the core portion 2230, but greater than the index of the cladding portion 2232. In this way, the optical mode may be predominantly confined in the core portion 2230 of the optical coupler 2200 at the shorter-width end 2418 of the nanotaper 2416.

In accordance with the above optical criteria, the relative lengths of the optical coupler 2200 and the nanotaper 2416 may be determined. In some example configurations, the lengths of the beveled surface portion 2234 and the nanotaper 2416 may be the same or substantially the same, as shown in FIG. 24. In alternative example configurations, the lengths may be different. In some example configurations, the maximum length or transverse diameter of the core portion 2230 of the beveled surface portion 2234 may be the same, different, and/or generally determined relative to length of the nanotaper 2416, regardless of the overall length of the beveled surface portion 2234. This may be particularly applicable for configurations of the optical coupler 2200 where the maximum length or transverse diameter of the core portion 2230 over the beveled surface portion 2234 may be different than the overall length of the beveled surface portion 2234, such as is shown in the various configurations of the optical coupler in FIGS. 3-21.

As previously described, the length of the beveled surface portion 2234 and/or the core portion 2230 of the beveled surface portion 2234, may depend on and/or be inversely proportional to the angle $\Theta$. As such, the angle $\Theta$ may be determined or selected to yield a desired length of the beveled surface portion 2234 and/or the core portion 2230 of the beveled surface portion 2234. Further, the angle $\Theta$ may be at least some minimum value greater than zero to provide a minimum amount of tapering of the core portion 2230 that prevents a prohibitively long length for the optical coupler 2200 to function as an adiabatic system with the nanotaper 2416 (e.g., the difference between a fundamental transverse electric $TE_0$ mode signal and a first-order $TE_1$ mode signal is too small). For some example configurations, the angle $\Theta$ may be in a range of about 0.1 to 5 degrees, such as 0.2 degrees, although other degree amounts or other ranges of degree amounts may be used to obtain a desired length of the beveled surface portion 2234 and/or the core portion 2230 of the beveled surface portion relative to the length of the nanotaper 2416, while still achieving an adiabatic system with the optical coupler 2200 and the nanotaper 2416.

In addition to the lengths of the optical coupler 2200 and the nanotaper 2416 being determined relative to each other, the optical coupler 2200 may be longitudinally aligned relative to the nanotaper 2416. Where the overall length of the beveled surface portion 2234 is the same or substantially the same as the length of the nanotaper 2416, the first end 2231 where the fourth surface portion 2240 is disposed may be aligned with the larger-width end 2420 of the nanotaper 2416, and the second end 2239 where the second exposed surface portion 2237 is disposed may be aligned with the smaller-width end 2418 of the nanotaper 2416. Alternatively, the longitudinal alignment between the nanotaper 2416 and the optical coupler 2200 may be relative to the length of the core portion 2230 over the beveled surface portion 2234. For example, a first endpoint 2490 along the major axis of the elliptically shaped core portion 2230 may be aligned with the larger-width end 2420 of the nanotaper 2416, and a second endpoint 2492 along the major axis may be aligned with the smaller-width end 2418.

In alternative configurations where the length of the beveled surface portion 2234 and/or the maximum length or transverse diameter of the core portion 2230 is different than the length of the nanotaper 2416, longitudinal alignment may be relative to one of the ends 2418, 2420 of the nanotaper 2416, but not the other. For example, the second end 2239 of the beveled surface portion and/or the second endpoint 2492 of the core portion 2230 may be aligned with the shorter-width end 2418 of the nanotaper 2416. The first end 2231 and/or the first endpoint 2490 may be disposed relative to the large-width end 2420 depending on the respective lengths of the beveled surface portion 2234 and the nanotaper 2416. For example, if the beveled surface portion 2234 is longer than the nanotaper 2416, then the first end 2231 and/or the first endpoint 2490 may extend beyond the larger-width end 2420 of the nanotaper 2416 and be positioned over the uniform waveguide portion 2422. Alternatively, if the beveled surface portion 2234 is shorter than the nanotaper 2416, then the first end 2231 and/or the first endpoint 2490 may be positioned over the nanotaper 2416 before the nanotaper 2416 is finished inversely tapering. In still other alternative configurations where the lengths are different, longitudinal alignment may be relative to the larger-width end 2420 instead of the shorter-width end 2418.

For some example manufacturing processes, the optical coupler 2200 may be axially and/or longitudinally aligned with the nanotaper 2416 passively by defining lithographically defined features on the optical IC 2204. A vision based system may be used to place the optical coupler 2200 over the IC front end 2202 aligned to the core 2310 relative to these lithographically defined features.

Referring to FIGS. 22 and 24, the optical system may also include an optical fiber support structure 2250 that is configured to receive the fiber end 2206 and position and support the fiber end 2206 in an optimally aligned position so that a core portion 2224 of the fiber end 2206 is in optimal axial alignment with the core portion 2230 of optical coupler 2200 at the second end 2239 to achieve optimum coupling between the optical fiber 2208 and the optical coupler 2200.

As shown in FIG. 22, the fiber end 2206 may abut or be butt coupled to the second end 2239 of the optical coupler 2200 to optically couple the fiber end 2206 with the second exposed surface portion 2237 of the optical coupler 2200. When positioned in the support structure 2250, the fiber end 2206 may be butt coupled with the second end 2239 of the optical coupler 2200 in an optimally aligned position relative to the optical coupler 2200 to achieve optimum coupling between the two optical structures.

Figure 25:
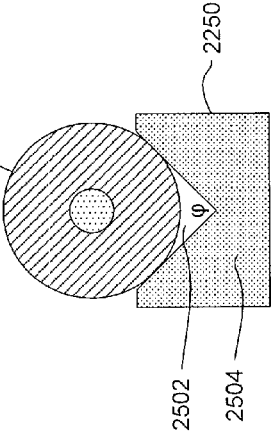
FIG. 25 illustrates a cross-sectional axial view of the example optical system, showing an optical fiber disposed in a support structure.

FIG. 25 shows a cross-sectional axial view of the optical system taken along line 25-25. The support structure 2250 may include a channel 2502 formed in a body 2504 of the support structure 2250. The channel 2502 may be configured to receive, position, and support the fiber end 2206 in the optimally aligned position. In the example configuration shown in FIG. 25, the channel 2502 may be a V-groove or V-groove type channel. The V-groove 2502 may be formed using planar lithography techniques and etching, such as potassium hydroxide (KOH) etching. That is, planar lithography techniques and etching may be used to form a channel to hold the optical fiber 2208 to passively align the fiber end 2206 with the optical coupler 2200 and the optical waveguide path to achieve optimum alignment and coupling.

A size of the V-groove 2502 may be determined by an angle $\phi$, which may depend on the material properties of the material making up the body 2504. In some example configurations, the body 2504 may be made of silicon, and the angle φ may be about 70 degrees, which may depend on the crystalline structure of the silicon. Other materials and or angles of the V-groove 2502 are possible. Also, alternative example configurations may include different types of channels other than V-grooves, such as U-shaped channels, rectangular shaped channels, or trapezoidal shaped channels. These different types of channels or shaped channels may depend on the material making up the body 2504 and/or the type of process used to make the channel 2502. Various configurations are possible.

Referring back to FIG. 22, for some example configurations, the support structure 2250 may be part of or integrated with the substrate 2214 of the optical IC 2204. For example, the support structure 2250 may be part of and made of the same material as a base layer 2260 of the substrate 2214. In alternative example configurations, the support structure 2250 may be a component of the optical system that is separate from and/or external to the substrate 2214, and that may be positioned adjacent to or near the substrate 2214 in the optical system. Various configurations are possible.

In sum, when the core portion 2230 of the optical coupler 2200 is positioned and aligned with core 2310 of the nano-taper 2416, and the fiber end 2206 of the optical fiber 2208 is positioned in the channel 2502 (FIG. 25), the optical coupler 2200 may optically couple the waveguide path formed by the core 2310 with the optical fiber 2208 with optimum coupling efficiency. In this way, optical signals being communicated between the optical IC 2204 and the optical fiber 2208 may transition between the waveguide mode and optical fiber modes with minimum loss and/or maximum coupling efficiency.

The optical system shown in FIGS. 22-25 is not limited to including all of the optical coupler 2200, the optical IC 2204, and the optical fiber 2208. Some configurations of the optical system may include the optical IC 2204 and the optical coupler 2200, but may not include the optical fiber 2208. Alternatively, the optical system may include the optical coupler 2200 and the optical IC 2204 without the support structure 2250, and the support structure 2250 may be considered a component that is separate to the optical system. In still other example alternative configurations, the optical system may include the IC front end 2202 without other portions of the optical IC 2204. For example, the IC front end 2202 may be a standalone component that is considered separate from other optical IC portions. The standalone IC front end 2202 may be integrated with the optical coupler 2200, and together, the IC front end 2202 and the optical coupler 2200 may be used or implemented with one or more optical integrated circuits. Various configurations or combinations of configurations of the optical system are possible.

In addition, the optical system shown and described with reference to FIGS. 22-25 is described for optical ICs using SOI. The components and features of the optical system may be equally or similarly applicable to optical ICs that use material technologies other than SOI or that use other types of semiconductor materials, such as Germanium (Ge) or compound semiconductor materials, such as Gallium Arsenide (GaAs), Aluminium Gallium Arsenide ($Al_xGa_xAs$), Indium Phosphide (InP), Indium Gallium Arsenide ($In_xGa_{1-x}As$), Indium Gallium Arsenide Phosphide ($In_xGa_{1-x}As_yP_{1-y}$), Indium Aluminum Arsenide ($In_xAl_{1-x}As$), Indium Aluminum Gallium Arsenide ($In_xAl_yGa_{1-x-y}As$), Gallium Nitride (GaN), Aluminum Gallium Nitride ($Al_xGa_{1-x}N$), Aluminum Nitride (AlN), or Gallium Antimodide (GaSb), as examples. Alternatively, the substrate 2214 and the core 2310 may be made of one or more polymers or polymer materials. Other materials or configurations of materials are possible.

For some example configurations, the optical coupler may be disposed or positioned within a housing for manufacturability or support. FIGS. 26-29 show various views of the optical coupler 2200 positioned in an example housing 2600. In alternative embodiments, other example optical couplers, including those previously shown and described with reference to FIGS. 3-25, may be similarly positioned within the example housing 2600.

Figure 26:
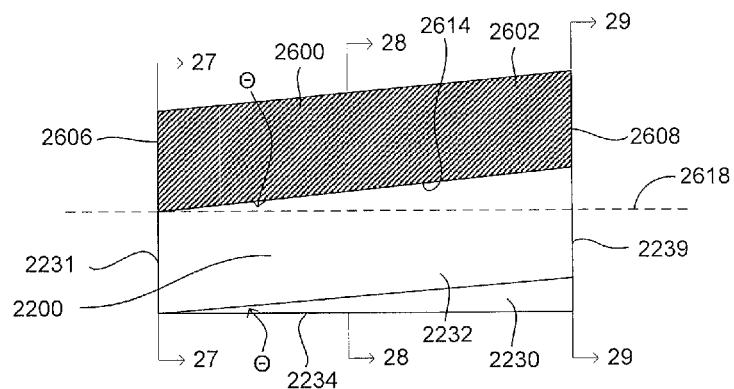
FIG. 26 illustrates a cross-sectional side view of an example optical coupler disposed in an example housing.

The housing 2600 may include a body 2602 and a channel 2604 extending in the body 2602 from a first end 2606 to a second, opposing end 2608. The optical coupler 2200 may be positioned in the channel 2604. The channel 2604 may have a height or depth that increases in accordance with the angle Θ. Dotted line 2618 is shown in FIG. 26 to indicate a plane parallel or substantially parallel with the beveled surface portion 2234 to identify the angle Θ. When the optical coupler 2200 is positioned in the channel 2604 of the housing 2600, a base surface 2614 of the body 2602 may be coplanar or substantially coplanar with the beveled surface portion 2234 of the outer surface of the optical coupler 2200. The coplanar surfaces 2234, 2614 may be suitable for mounting and affixing the optical coupler 2200 with the housing 2600 to a top layer of an optical IC.

For the example housing 2600, the body 2602 may be made of a material that is the same or similar to the fiber optic materials used for the core portion 2230 or the cladding portion 2232 of the optical coupler 2200. An example material may be glass. When glass is the material used for the body 2602, a cutting procedure in which a cutting mechanism, such as a saw cutting into the body 2602, may be a suitable removal procedure to remove material from the body to form the channel 2604. In alternative configurations, an etching process may be used to remove the glass material from the body to form the channel 2604.

Figures 27, 28:
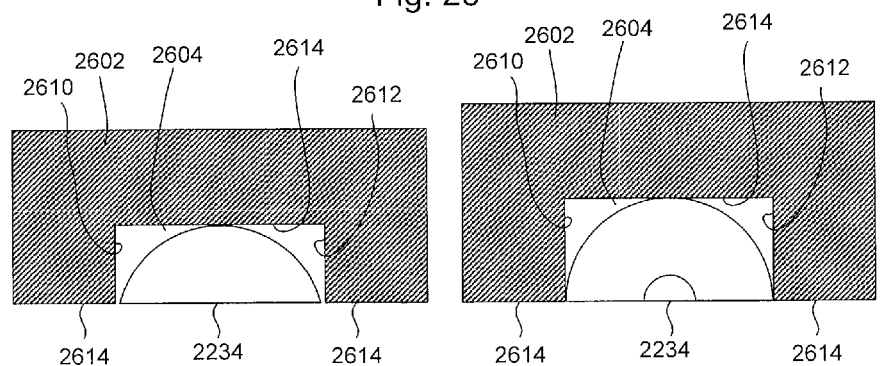
FIG. 27 illustrates a cross-sectional axial view of the optical coupler and housing in FIG. 26.
FIG. 28 illustrates another cross-sectional axial view of the optical coupler and housing in FIG. 26.
Figure 29:
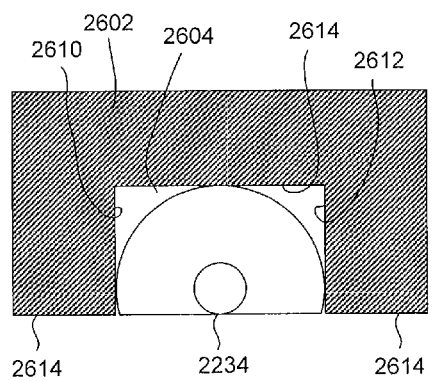
FIG. 29 illustrates a third cross-sectional axial view of the optical coupler and housing in FIG. 26.

The cutting procedure, or the removal procedure generally, may determine the cross-sectional shape for the channel 2601. As shown in FIGS. 27-29, the channel 2604 may have a generally rectangular cross-sectional shape, which may be defined or determined by inner walls 2610, 2612, and 2614. Cross-sectional shapes other than rectangular, such as U-shaped or trapezoidal shapes, may be formed, depending on the cutting mechanism and/or the material used for the body 2602. For example, in alternative example embodiments, the body 2602 may be made of a material, such as silicon, in which etching and planar lithography techniques may be used to form the channel 2604. For these alternative embodiments, the channel 2604 may be a V-groove, similar to the V-groove 2502 shown in FIG. 25.

As shown in FIG. 26, the length of the housing 2600 from the first end 2606 to the second end 2608 may be the same or substantially the same as the length of the optical coupler 2200 from the first end 2231 to the second end 2239. Alternatively, the lengths may be different and in some example configurations, the optical coupler 2200 may extend beyond the ends 2606, 2608 of the housing 2600, depending on the process used to manufacture the optical coupler 2200 and the housing 2600.

FIGS. 30-33 show various views of the optical coupler 2200 positioned in an alternative example housing 3000 that includes a body 3002 and a channel 3004 extending in the body 3002 from a first end 3006 to a second end 3008. The alternative example housing 3000 may be made of a material in which etching and planar lithography techniques may be a suitable removal process to form the channel 3004, such as silicon.

In the example configuration shown in FIGS. 30-33, the channel 3004 may be formed as a V-groove extending in the body 3002 of the housing 3000, which may be similar to the V-groove 2502 shown in FIG. 25. The V-groove 3004 may be formed using etching and planar lithography techniques. The V-groove channel 3004 may be defined or determined by inner walls 3010, 3012 of the body 3002. The V-groove 3004 may also be defined or determined by an angle 8 formed by an intersection of the two inner walls 3010, 3012, such as at a point or corner 3016, although other shaped intersections are possible depending on the etching and lithography techniques used. Also, the angle δ may depend on the material properties of the material making up the body 3002. In some example configurations, the body 3002 may be made of silicon, and the angle δ may be about 70 degrees, which may depend on the crystalline structure of the silicon, as previously described.

As shown in FIGS. 30-33, when the optical coupler 2200 is positioned in the housing 3000, the base surface 3014 may be coplanar or substantially coplanar with the beveled surface portion 2234 of the outer surface of the optical coupler 2200. So that the beveled surface portion 2234 and the base surface 3014 may be flush or coplanar, the V-groove channel 3004 may have a height or depth that increases over a length of the housing 3000 extending from the first end 3006 to a second end 3008. The increasing height may be proportional to the increasing height of the optical coupler 2200 while the angle δ of the V-groove 3004 may remain constant over the length.

Figure 30:
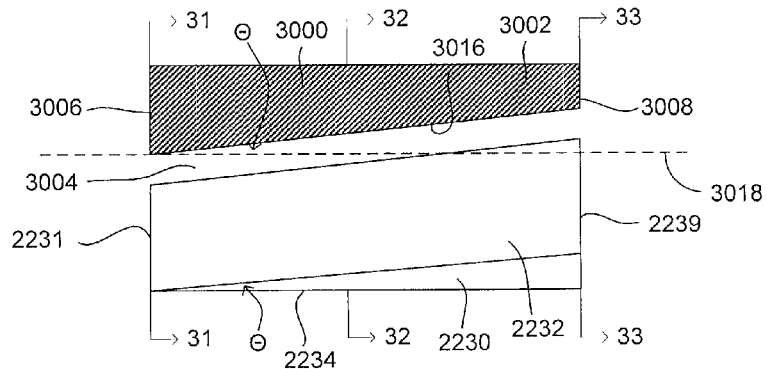
FIG. 30 illustrates a cross-sectional side view of an example coupler disposed in an alternative example housing.
Figures 31, 32:
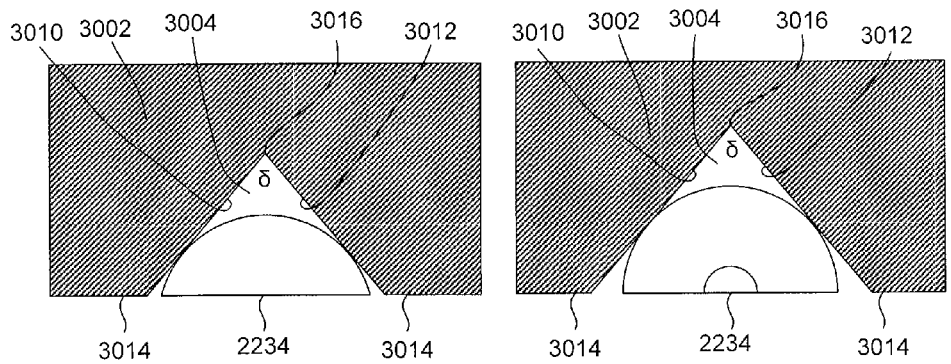
FIG. 31 illustrates a cross-sectional axial view of the optical coupler and alternative housing in FIG. 30.
FIG. 32 illustrates another cross-sectional axial view of the optical coupler and alternative housing in FIG. 30.
Figure 33:
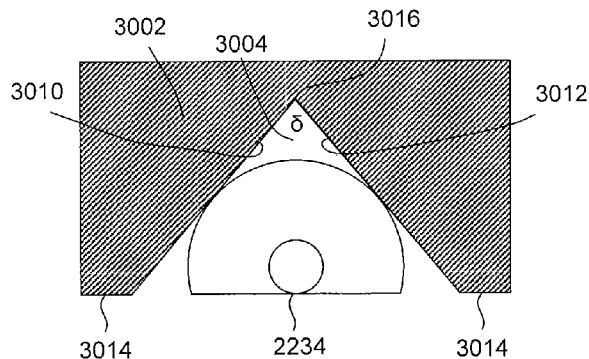
FIG. 33 illustrates another cross-sectional axial view of the optical coupler and alternative housing in FIG. 30.

As shown by the cross-sectional views in FIGS. 31-33, the height of the V-groove 3004 may be determined or defined as a distance extending from a point or position coplanar with the base surface 3014 to the intersection 3016 of the inner walls 3010, 3012. The height may increase over the length of the housing 3000 in accordance with and/or proportional to the increasing height of the optical coupler 2200, which may depend on the angle Θ. Dotted line 3018 is shown in FIG. 30 to indicate a plane parallel or substantially parallel with the flat exposed surface portion 3014 to identify the angle Θ.

For some configurations, the example housing 2600 made of glass (i.e., a material that is the same or similar to the fiber optic materials used for optical coupler 2200) may be preferred over the example housing 3000 made of silicon (i.e., a material different than the fiber optic materials used for the optical coupler 2200). In particular, when the materials are the same or similar, an optical fiber may be integrated with the housing before the optical coupler is formed from the optical fiber. For example, the optical fiber may be positioned in a channel of uniform height in the glass housing. Once the optical fiber and the housing are integral components, any removal processes performed on the optical fiber to form the optical coupler may similarly and simultaneously be formed on the housing. As a result, the beveled surface portion of the optical coupler and the base surface of the glass housing may be more co-planar with each other. In contrast, when silicon is used, removal processes performed on an optical fiber to form the optical coupler may not be used to remove silicon. Instead, a channel, such as a V-groove, with an angled depth at the angle Θ may be formed, and the optical fiber may be positioned in the angled V-groove. A portion of the optical fiber may protrude or extend beyond the angled V-groove, and this portion may be removed to form the optical coupler. The resulting co-planar beveled surface portion and the base surface of the silicon housing may not be as co-planar or smooth as where a glass housing is used.

FIGS. 26-33 show the optical coupler 2200 positioned in the example housings 2600, 3000 in isolation. However, the optical coupler 2200 positioned in the housing 2600 or the housing 3000 may be used or implemented together in an optical system, such as the optical system shown in FIGS. 22-25. For example, the optical coupler 2200 positioned in the housing 2600 or the housing 3000 may be positioned over and affixed to the top layer 2268, as previously described.

The above description with reference to FIGS. 3-33 describes an optical coupler that is configured to optically couple an optical fiber with a single fiber optic core with a single waveguide path of an optical IC. Alternative optical systems may include a plurality or an array of optical waveguide paths that may communicate optical signals to a plurality or an array of optical fibers.

FIG. 34 shows a cross-sectional view of an example optical system that includes a plurality of waveguide paths 3410A, 3410B, 3410C disposed on a BOX layer 3412 of a substrate 3414. FIG. 34 shows three waveguide paths 3410A-C, although any number of optical waveguide paths may be included. A plurality of optical couplers 3400A-3400C, which may be configured in accordance with the example optical couplers shown in FIGS. 3-21, may be used to optically couple the plurality of waveguide paths 3410A-3410C with a plurality of optical fibers (not shown). Each of the optical couplers 3400A-3400C may be disposed over and aligned with one of the optical waveguide paths 3410A-3410C. In addition, as shown in FIG. 34, a support structure 3450 may include a plurality of channels 3402A-3402C to receive the plurality of optical fibers and passively align the plurality of optical fibers with the plurality of optical couplers 3400A-3400C. The channels 3402A-3402C, which may be V-grooves as shown in FIG. 25, may be formed using planar lithography and etching techniques, as previously described. The V-grooves 3402A-3402C may be separated by a pitch, which may be defined and/or supported by the etching and planar lithography techniques used to form the V-grooves.

FIG. 35 shows a cross-sectional view of another example optical system that includes a plurality of optical couplers 3500A-3500C, which may be configured in accordance with the optical couplers shown in FIGS. 3-21. The optical system shown in FIG. 35 is similar to the optical system shown in FIG. 34, and further includes a housing 3501 configured to house the plurality of optical couplers 3500A-3500C. The housing 3501 may be configured and/or formed similarly to the example housing 2600 shown in FIGS. 26-29, or the example housing 3000 shown in FIGS. 30-33. The housing 3501 includes a body 3502 and a plurality of channels 3504A-3504C configured to house the plurality of optical couplers 3500A-3500C. As shown in FIG. 35, the housing 3501 may include a single integrated body 3502. In alternative example configurations, the housing 3501 may include a plurality of separate bodies, each configured with one or more channels to house one or more optical couplers. Various configurations are possible.

Figure 35A:
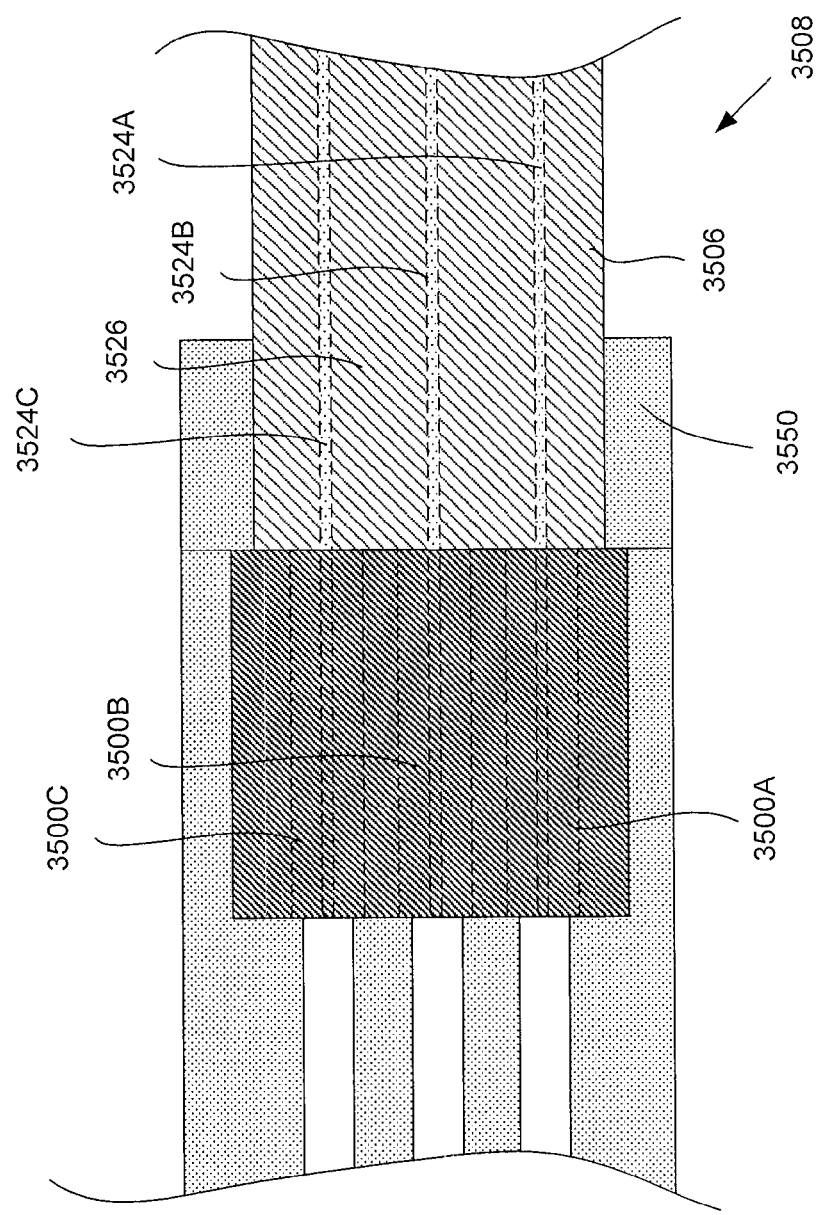
FIG. 35A illustrates a top view of the optical system in FIG. 35, showing the optical system optically coupled to a multi-core optical fiber.

The optical couplers 3400A-C, 3500A-C shown in FIGS. 34-35 may be used to optically couple a plurality of optical waveguide paths of an optical IC with a plurality of single core optical fibers. In other systems, the optical couplers 3400A-C, 3500A-C may be used to optically couple a plurality of optical waveguide paths of an optical IC with a single optical fiber that includes multiple cores (i.e., a multi-core optical fiber). Each of the optical couplers 3400A-C or 3500A-C may be configured to optically couple one core of the multi-core optical fiber with one of the optical waveguide paths of the optical IC. To illustrate, FIG. 35A shows a top view of the example optical system shown in FIG. 35, and further shows a fiber end 3506 of a multi-core optical fiber 3508 positioned in a support structure 3550 and butt coupled to the optical couplers 3500A-3500C (shown as dotted lines). The multi-core optical fiber 3508 is shown as including three cores 3524A, 3524B, and 3524C encased or embedded in a single cladding 3526. Each of the cores 3524A-3524C may be optically coupled to one of the optical couplers 3500A-3500C. In particular, as shown in FIG. 35A, the first core 3524A is optically coupled to the first optical coupler 3500A, the second core 3524B is optically coupled to the second optical coupler 3500B, and the third core 3524C is optically coupled to the third optical coupler 3500C.

Figure 36:
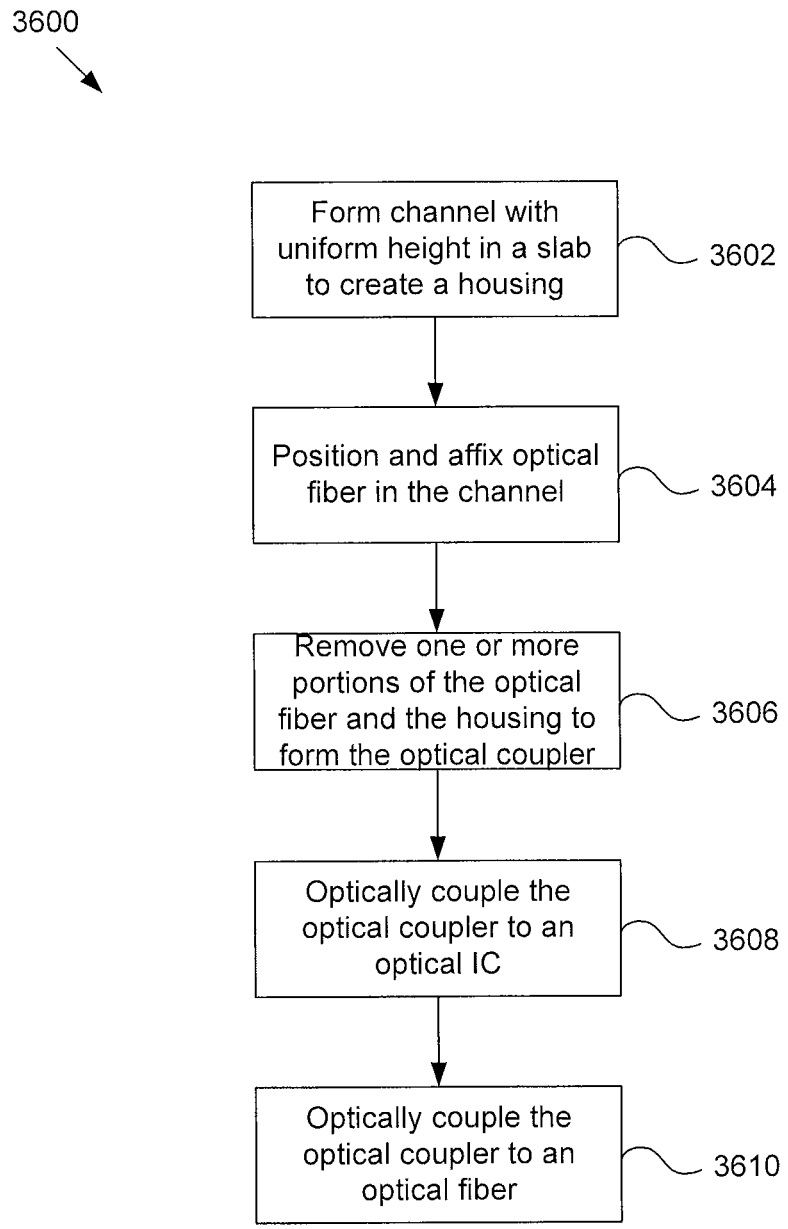
FIG. 36 illustrates a flow diagram of an example method of manufacturing an optical coupler and optically coupling the optical coupler with an optical integrated circuit and an optical fiber.

The present description also describes example methods of manufacturing an optical coupler with a housing and optically coupling the optical coupler with an optical waveguide path and an optical fiber. FIG. 36 shows a flow chart of an example method 3600 of manufacturing an optical coupler with a housing having a uniform depth channel. At block 3602, a channel with a uniform or substantially uniform depth may be formed in a slab to create the housing. The channel may be formed using various processes, depending on the material used for the housing. Example processes may include cutting or etching. For example, where glass is used, the channel may be formed using a cutting process, in which a saw or other cutting mechanism may be used to cut into the glass slab to form the channel. Alternatively, etching techniques may be used. As another example, where silicon is used as the material for the housing, the channel may be formed through planar lithography and etching techniques. The channel may be formed to have a uniform depth between opposing ends of the formed channel. In some examples, the depth of the channel may be the same or substantially the same as a size or diameter of an optical fiber used to make the optical coupler.

At block 3604, after the channel is formed in the slab, a portion, such as an end, of an optical fiber may be positioned in the channel. Also, at block 3604, the portion of the optical fiber may be secured in the channel by applying an adhesive material, such as an epoxy, which may affix the portion of the optical fiber positioned in the channel to inner walls of the slab defining the channel. When affixed to the inner walls of the slab, the slab and the optical fiber may form a combined or integrated structure.

At block 3606, one or more removal processes may be performed on the optical fiber positioned in the channel to form the optical coupler positioned in the housing. For example, a first removal process may remove a first portion of the optical fiber and the slab from a second portion of the optical fiber and the slab at a predetermined angle Θ relative to a longitudinal axis of the optical fiber. The second portion may be used for the optical coupler. After the first removal process is performed, an outer surface that includes a beveled exposed surface portion beveled at the angle Θ and a second exposed surface portion may be formed. Both exposed portions may include core and cladding portions of the optical fiber. One or more additional removal processes may be performed to remove further additional portions from the second portion formed from the first removal process. The additional removal processes may be performed to form an overall shape or size of the optical coupler and the housing. In particular, the additional removal processes may modify or reduce a length of the beveled surface portion and/or modify an orientation of the second exposed surface portion relative to the beveled exposed surface portion.

Various techniques may be used to perform the removal processes, including polishing, cleaving (e.g., laser cleaving), slicing, grinding, or combinations thereof. For example, a relatively large amount of the slab and the optical fiber may be removed using cleaving techniques, and a remaining relatively small amount of the housing and the optical fiber (e.g., 4-5 μm) may be removed using polishing techniques. Other techniques, currently known or later developed, may be used during the removal processes. Also, where the housing is made of glass or other similar material as the materials of the optical fiber, the various techniques or processes used to remove portions of the optical fiber to form the optical coupler—such as cleaving, slicing, grinding, polishing etc.— may also be used to remove portions of the housing. In this way, any removal processes performed on the optical fiber may simultaneously be performed on the housing, which may yield a substantially uniform or smooth overall surface between the beveled surface portion of the optical coupler and a base surface portion of the housing.

Additional or further manufacturing processes may be performed to optically couple the optical coupler and housing with a waveguide path of an optical IC. For example, at block 3608, the optical coupler and the housing may be positioned over and/or affixed to a front end of the optical IC. In particular, the optical coupler may be positioned over and/or aligned with a nanotaper portion of an optical waveguide path at a front end of the optical waveguide path. For some examples, the optical coupler may be axially and/or longitudinally aligned with the nanotaper passively by implementing lithographically defined features on the optical IC. A vision based system may be used to place the optical coupler over the IC front end aligned to the nanotaper relative to these lithographically defined features.

Also, at block 3608 the optical coupler and housing may be affixed to the optical IC. To affix the optical coupler to the optical IC, one or more optically transparent adhesive portions may be applied to a top layer of the optical IC. In some examples, the adhesive portion may be a top sub-layer that may be added or applied over a core of the optical waveguide. In addition or alternatively, the adhesive portion may be applied by filling trenches extending longitudinally along sides of the core. The trenches may be formed using various etching techniques, such as KOH or DRIE as examples. After the trenches are formed, the trenches may be filled with the adhesive material.

Still further or additional processes may be performed to optically couple the optical coupler with a fiber end of an optical fiber. For example, at block 3610, a channel may be formed in a substrate or support structure portion of the optical IC. The channel may be formed using various techniques such as planar lithography and etching. The channel may be aligned with an optical waveguide path of the optical IC. Also, at block 3610, after the channel is formed, the fiber end of the optical fiber may be positioned in the channel. When positioned in the channel, the fiber end may be butt coupled with the second exposed surface portion of the optical coupler.

Figure 37:
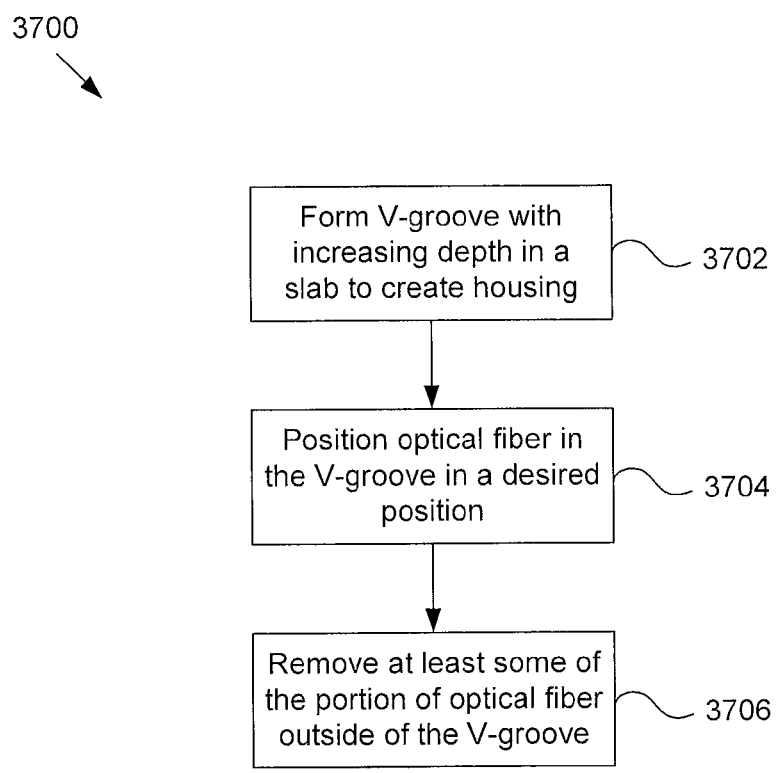
FIG. 37 illustrates a flow diagram of another example method of manufacturing an optical coupler.

FIG. 37 shows a flow chart of another example method 3700 of manufacturing an optical coupler with a housing made of an etchable material, such as silicon. At block 3702, a channel may be formed in a slab to create the housing. The channel may be a V-groove trench that is formed using planar lithography and etching techniques. The V-groove trench may be etched to have a height or depth that varies corresponding to a varying height of the optical coupler to be formed, which may depend on the angle Θ. The height or depth of the V-groove trench may be varied by increasing the width of a mask layer defining the V-groove trench along its length during the lithography and/or etching processes.

At block 3704, after the channel is formed in the slab and the housing is created, a portion of an optical fiber may be inserted and positioned at a desired position in the V-groove. The optical fiber may be positioned in the V-groove trench such that no core material (or a negligible amount) is in the V-groove at one end of the housing, and such that a full axial cross-section of the core material (such as a complete circular cross-section) is in the V-groove at a second-opposing end of the housing. Also, at block 3704, once the optical fiber is positioned in the desired position, an epoxy or other adhesive material may be applied within the V-groove around the optical fiber to affix the optical fiber to the housing.

When the optical fiber is in the desired position, only a portion of the optical fiber may be within or inside the V-groove, and a remaining portion may be located outside of the V-groove (and the housing generally). At block 3706, at least some of the remaining, outside portion may be removed or detached from the portion of the optical fiber in the V-groove. The outside portion may be removed such that after the outside portion is removed, the portion of optical fiber inside the V-groove trench has a flat and/or polished surface that includes both the core and cladding portions of the optical fiber. The flat and/or polished surface may be flush or substantially even with a base surface of the housing. Various techniques may be used to remove the outside portion, including polishing, cleaving (e.g., laser cleaving), slicing, grinding, or combinations thereof. For example, a relatively large amount of the outside portion may be removed using cleaving techniques, and a remaining relative small amount of the outside portion (e.g., 4-5 µm) may be removed using polishing techniques. Other techniques, currently known or later developed, may be used during the removal process. After the removal process is performed at block 3706, an optical coupler made of an angled optical fiber structure with a height that increases at a predetermined angle as the optical fiber structure longitudinally extends in the housing and that has a flat, polished surface exposing the core of the optical fiber may be created.

After the flat surface is formed, other portions of the outside portion may still remain. For some configurations, all of the remaining portions may be removed as well using all or some of the removal techniques or processes described above. For other configurations, at least some of the remaining portions may be kept attached to the optical fiber portion in the V-groove.

After the flat surface is formed and other portions of the outside portion are optionally removed, further or additional acts may be performed to optically couple the optical coupler positioned in the housing with an optical waveguide path of an optical IC and a fiber end of an optical fiber, as described above.

The above-described methods 3600 and 3700 are described for making a single optical coupler disposed in a single channel. Similar processing techniques may be used to make a plurality of optical couplers disposed in a plurality of channels of a housing.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:
    affixing an optical fiber in a channel formed in a slab to form an integrated structure, the optical fiber comprising a core portion and a cladding portion;
    removing a first portion of the integrated structure from a second portion of the integrated structure at a predetermined angle defined relative to a longitudinal axis of the fiber optic structure, wherein the second portion has an outer surface portion that is beveled at the predetermined angle after removing the first portion from the second portion, and wherein the beveled outer surface portion comprises both the core portion and the cladding portion;
    removing a third portion of the integrated structure from the second portion to form a second outer surface portion adjacent the beveled outer surface portion; and
    removing a fourth portion of the integrated structure from the second portion to form a third outer surface portion, wherein the third outer surface portion is adjacent to the beveled outer surface portion and opposes the second outer surface portion.

2. The method of claim 1, wherein the channel has a substantially uniform depth in the slab from a first end to a second end of the slab.

3. The method of claim 2, wherein the uniform depth of the channel is about equal to a diameter of the optical fiber.

4. The method of claim 1, wherein the slab comprises a glass material, and wherein the channel is formed through a cutting process.

5. The method of claim 1, wherein the slab comprises silicon, and wherein the channel is formed through at least one of: lithography or an etching process.

6. The method of claim 1, wherein removing the first portion from the second portion comprises performing at least one of: a polishing process, a cleaving process, a slicing process, or a grinding process on the integrated structure.

7. The method of claim 1, further comprising:
    affixing the beveled outer surface portion to a top surface of a top layer of an optical integrated circuit, the top layer comprising a waveguide core that forms an optical waveguide path of the optical integrated circuit.

8. The method of claim 7, further comprising:
    aligning the core portion of the beveled outer surface with a nanotaper of the waveguide core before affixing the beveled outer surface to the top surface.

9. The method of claim 7, further comprising:
    forming a pair of trenches in the top layer, each of the pair of trenches extending along a side of at least a portion of the waveguide core; and
    adding an adhesive material in each of the pair of trenches, wherein the beveled outer surface portion is affixed to the adhesive material in the trenches.

10. The method of claim 9, wherein the top layer further comprises a waveguide cladding surrounding the waveguide core, and wherein forming the pair of trenches comprises forming the pair of trenches in the waveguide cladding.

11. The method of claim 1, wherein the predetermined angle is in a range of about 0.1 degrees to 5 degrees.

12. A method comprising:
    applying an adhesive material to a top layer of an optical waveguide structure of an optical integrated circuit;
    aligning a beveled outer surface portion of a fiber optic structure with a nanotaper portion of the optical waveguide structure, the beveled outer surface beveled at a predetermined angle relative to a longitudinal axis of the fiber optic structure;
    contacting the beveled outer surface of fiber optic structure to the adhesive material to affix and optically couple the fiber optic structure to the optical waveguide structure; and
    positioning a fiber end of an optical fiber in a channel of a support structure of the optical integrated circuit to butt couple the fiber end with a second outer surface portion of the fiber optic structure, the optical fiber being optically coupled to the fiber optic structure when positioned in the channel of the support structure.

13. The method of claim 12, further comprising:
performing at least one of an etching process or a planar lithography process on the support structure to form the channel.

14. The method of claim 12, wherein the optical integrated circuit is configured in accordance with silicon on insulator technology, the method further comprising:
forming at least one trench that extends along the nanotaper portion and into at least a portion of a buried oxide layer of the optical integrated circuit.

15. A method comprising:
affixing an optical fiber in a channel formed in a slab to form an integrated structure, the optical fiber comprising a core portion and a cladding portion;
removing a first portion of the integrated structure from a second portion of the integrated structure at a predetermined angle defined relative to a longitudinal axis of the fiber optic structure, wherein the second portion has an outer surface portion that is beveled at the predetermined angle after removing the first portion from the second portion, and wherein the beveled outer surface portion comprises both the core portion and the cladding portion;
affixing the beveled outer surface portion to a top surface of a top layer of an optical integrated circuit, the top layer comprising a waveguide core that forms an optical waveguide path of the optical integrated circuit;
forming a pair of trenches in the top layer, each of the pair of trenches extending along a side of at least a portion of the waveguide core; and
adding an adhesive material in each of the pair of trenches, wherein the beveled outer surface portion is affixed to the adhesive material in the trenches.

16. The method of claim 15, wherein the top layer further comprises a waveguide cladding surrounding the waveguide core, and wherein forming the pair of trenches comprises forming the pair of trenches in the waveguide cladding.

17. The method of claim 15, wherein the channel has a substantially uniform depth in the slab from a first end to a second end of the slab.

18. The method of claim 15, wherein the slab comprises a glass material, and wherein the channel is formed through a cutting process.

19. The method of claim 15, wherein the slab comprises silicon, and wherein the channel is formed through at least one of lithography or an etching process.

20. The method of claim 15, further comprising:
aligning the core portion of the beveled outer surface with a nanotaper of the waveguide core before affixing the beveled outer surface to the top surface.

* * * * *